(12) United States Patent
Yoshida

(10) Patent No.: US 9,083,849 B2
(45) Date of Patent: Jul. 14, 2015

(54) TRANSMISSION TERMINAL, TRANSMISSION SYSTEM, AND NON-TRANSITORY COMPUTER READABLE STORAGE MEDIUM

(71) Applicant: Kumiko Yoshida, Tokyo (JP)

(72) Inventor: Kumiko Yoshida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 32 days.

(21) Appl. No.: 14/136,027

(22) Filed: Dec. 20, 2013

(65) Prior Publication Data
US 2014/0253668 A1    Sep. 11, 2014

(30) Foreign Application Priority Data
Mar. 11, 2013    (JP) .................................. 2013-048495

(51) Int. Cl.
*H04N 7/14*    (2006.01)
*H04N 7/15*    (2006.01)

(52) U.S. Cl.
CPC ........................................ *H04N 7/15* (2013.01)

(58) Field of Classification Search
USPC .......... 348/14.01, 14.07, 14.03, 14.14, 14.12
See application file for complete search history.

(56) References Cited

U.S. PATENT DOCUMENTS

| | | | |
|---|---|---|---|
| 7,991,829 B2 | 8/2011 | Takano | |
| 8,325,213 B2 * | 12/2012 | Lamb et al. | ................ 348/14.01 |
| 2012/0069132 A1 | 3/2012 | Kato | |

FOREIGN PATENT DOCUMENTS

| | | |
|---|---|---|
| JP | 2005-332160 | 12/2005 |
| JP | 2007-323285 | 12/2007 |
| JP | 2008-090526 | 4/2008 |
| JP | 2011-018333 | 1/2011 |
| JP | 2011-205648 | 10/2011 |
| JP | 2012-085269 | 4/2012 |

* cited by examiner

*Primary Examiner* — Olisa Anwah
(74) *Attorney, Agent, or Firm* — Oblon, McClelland, Maier & Neustadt, L.L.P.

(57) ABSTRACT

A transmission terminal includes a communication unit that communicates with an information providing device; a display control unit that displays first image data created by a photographing unit, second image transmitted from an other transmission terminal, and/or display data received from the information providing device on a display screen; a network communication unit that communicates the first image data, the second image data, and the display data with the other transmission terminal; a screen information capture unit that saves screen information on the display screen; a query unit that queries the other transmission terminal whether capturing of the screen information is allowed, and determines that capture of the screen is disallowed when no response is received within a predetermined time period; a screen editor unit that edits the screen information; and a screen information storage unit that stores the screen information edited by the screen editor unit.

10 Claims, 18 Drawing Sheets

FIG.7

| REGION | IDENTIFICATION INFORMATION OF TRANSMISSION TERMINAL | DISPLAY CONTENTS |
|---|---|---|
| A21 | AAA | IMAGING DATA |
| A22 | BBB | IMAGING DATA |
| A23 | CCC | IMAGING DATA |
| A24 | — | — |

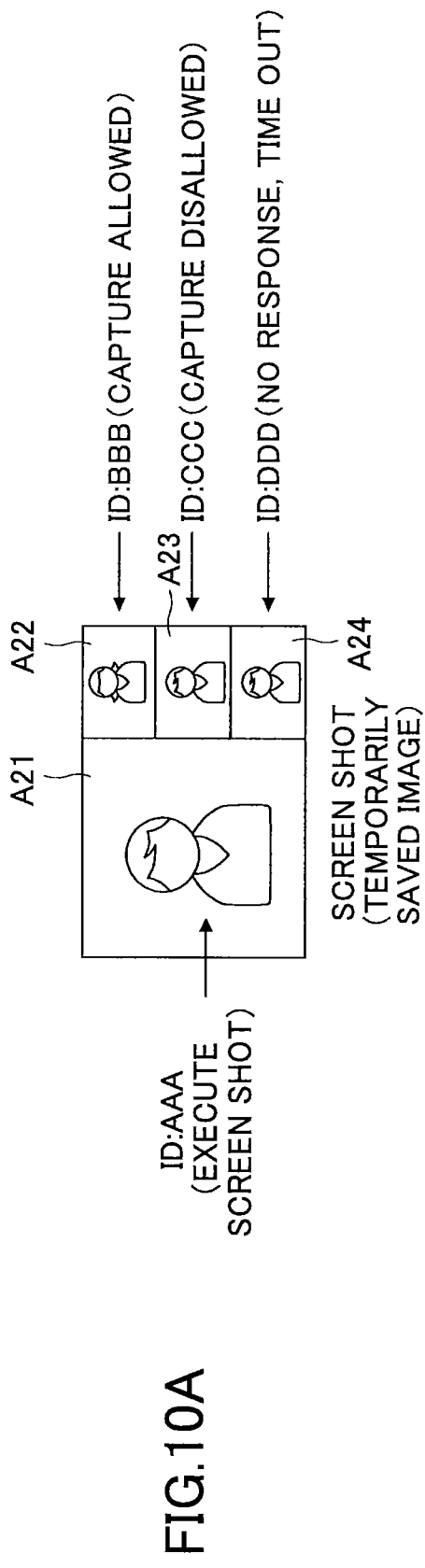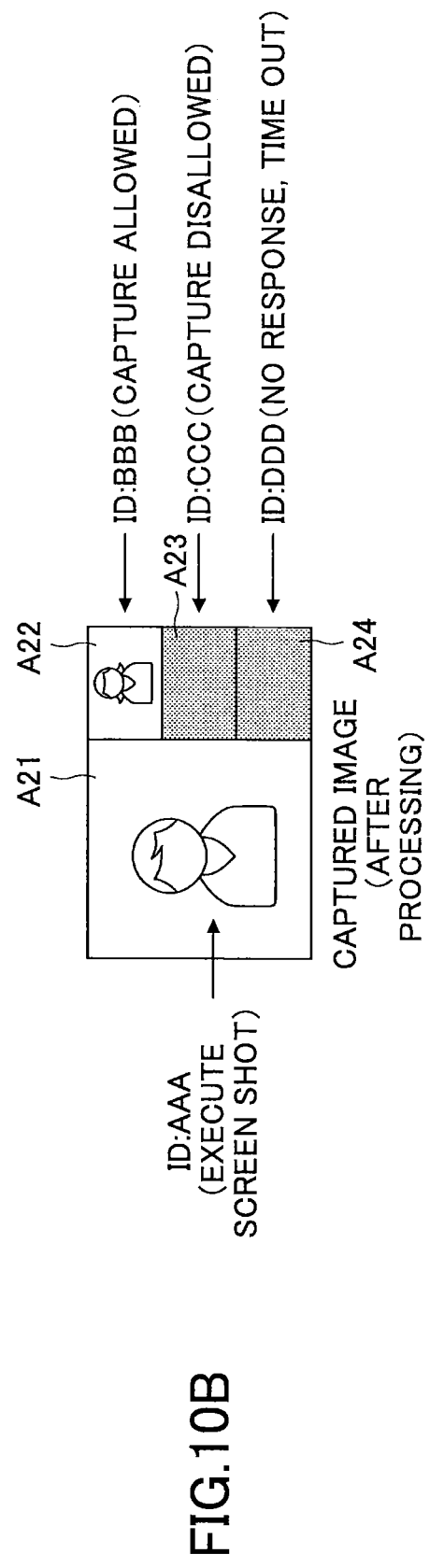

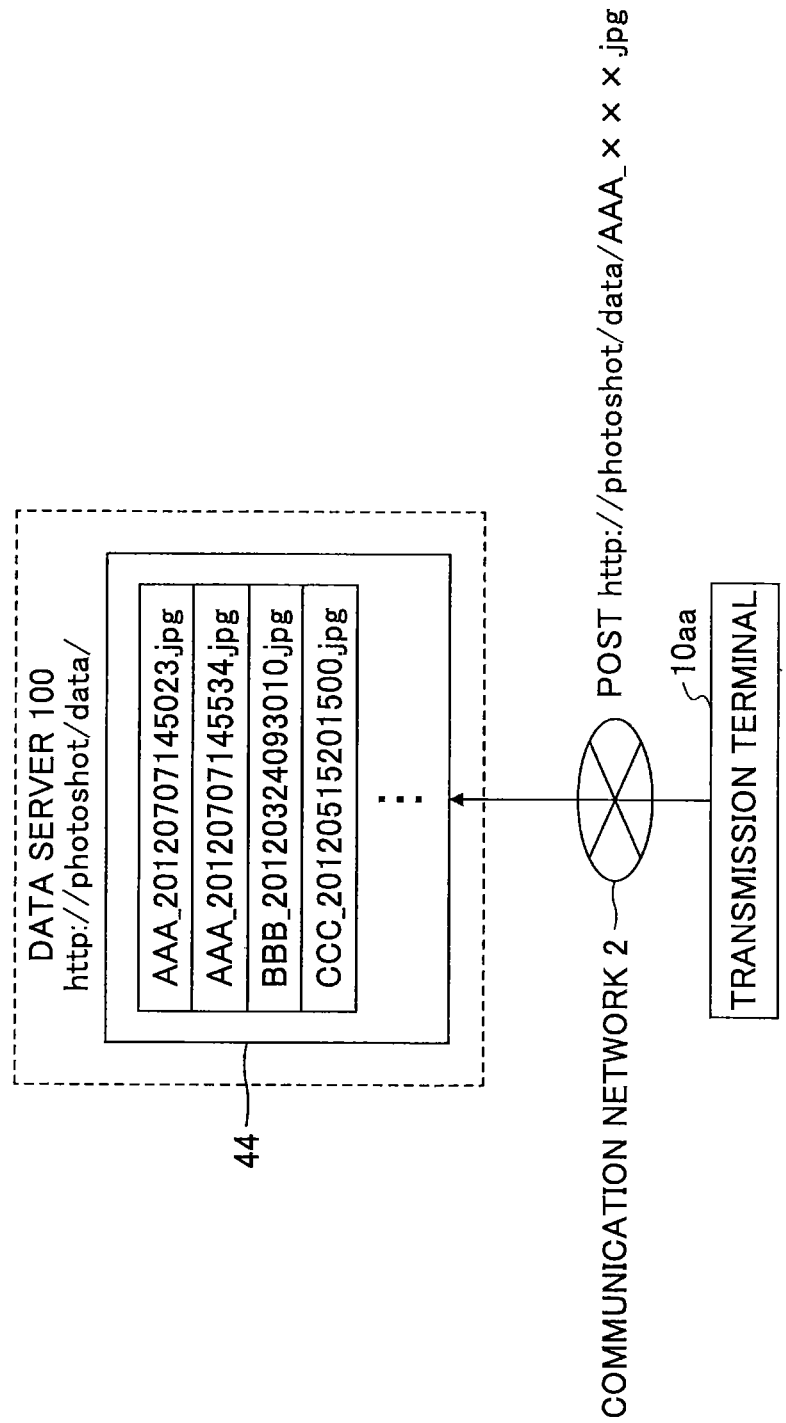

TRANSMISSION TERMINAL, TRANSMISSION SYSTEM, AND NON-TRANSITORY COMPUTER READABLE STORAGE MEDIUM

BACKGROUND OF THE INVENTION

1. Field of the Invention

The present invention relates to a transmission terminal that communicates predetermined data including image data with another transmission terminal connected to a communication network.

2. Description of the Related Art

Recently, transmission systems have been widely used, with which a conference or the like can be conducted through a communication network, such as the Internet. In such a transmission system, a transmission terminal including, for example, a camera, a microphone, and a speaker may be used. When the communication terminal starts a telephone call (communication) with another communication terminal, image data or audio data obtained by the camera or the microphone of the corresponding communication terminal is communicated. In this manner, with the communication terminal, a video conference can be conducted.

When a video conference is conducted by using a transmission terminal, a party of the video conference may use its own external input device, such as a personal computer (PC), besides the transmission terminal. The party of the video conference may display conference material on a display of the external input device, and may have a discussion with the other party of the video conference. The communication terminal receives display data, such as conference material, displayed by the external input device, and the communication terminal transmits the display data to the other communication terminal, which is used by the other party of the video conference.

In the communication system, an information providing device carried by the party of the video conference can be used as the external input device (cf. Patent Document 1 (Japanese Unexamined Patent Publication No. 2012-085269), for example). Patent Document 1 discloses a video conference system that displays image data of material or the like. In the video conference system, for example, a smart phone is used as the information providing device, and the information providing device communicates with the transmission terminal using Near Field Communication (NFC) or Bluetooth (registered trademark), and thereby the image data of the material is displayed.

In some cases, the party of the video conference may wish to save a screen displayed on the display of the transmission terminal. For such a need, a button for capturing the screen may be provided in the communication terminal, and the party may operate the button, depending on necessity.

On the display of the communication terminal, not only the image of the party itself which is captured by the camera, but also the image of the other party captured by the other communication terminal is displayed. Thus, if it were possible for the party to freely save the displayed image, a capture of the image of the other party could be freely produced. When the information providing device transmits display data, such as image data of conference materials, to the communication terminal, the display of the communication terminal may display an image, such image of the conference material. Accordingly, if it were possible for the party to freely capture the displayed image, a copy of important materials could be freely made.

There is a need for a transmission terminal that can restrict capturing of a displayed image, which is displayed on a display of the transmission terminal.

SUMMARY OF THE INVENTION

According to an aspect of the present invention, there is provided a transmission terminal including a communication unit configured to communicate with an information providing device that displays a predetermined image; a display control unit configured to display at least one of first image data created by a photographing unit, second image transmitted from an other transmission terminal, and display data received from the information providing device on a display screen; a network communication unit configured to communicate the first image data, the second image data, and the display data with the other transmission terminal, the other transmission terminal being connected to a communication network; a screen information capture unit configured to capture screen information displayed on the display screen; a query unit configured to query the other transmission terminal whether capturing of the screen information is allowed, and configured to determine that the other transmission terminal disallows capturing of the screen image when no response is received from the other transmission terminal within a predetermined time period after making the query; a screen editor unit configured to edit the screen information in regard to a response from the other transmission terminal; and a screen information storage unit configured to store the screen information, wherein the screen information is edited by the screen editor unit in regards to the response.

According to another aspect of the present invention, there is provided a transmission system including a transmission terminal, an other transmission terminal, and an information providing device. The transmission terminal includes a communication unit configured to communicate with the information providing device that displays a predetermined image; a display control unit configured to display at least one of first image data created by a photographing unit, second image data transmitted from the other transmission terminal, and display data received from the information providing device on a display screen; a network communication unit configured to communicate the first image data, the second image data, and the display data with the other transmission terminal, wherein the other transmission terminal is connected to a communication network; a screen information capture unit configured to save screen information displayed on the display screen; a query unit configured to query the other transmission terminal whether capturing of the screen information is allowed, and configured to determine that the other transmission terminal disallows capturing of the screen image when no response is received from the other transmission terminal within a predetermined time period after making the query; a screen editor unit configured to edit the screen information in regards to a response from the other transmission terminal; a screen information storage unit configured to store the screen information, wherein the screen information is edited by the screen editor unit in regards to the response; and a display data transmission unit configured to transmit the display data to the other transmission terminal.

According to another aspect of the present invention, there is provided a non-transitory computer-readable storage medium storing a program that causes a computer to execute a process. The process includes communicating with an information providing device that displays a predetermined image; displaying at least one of first image data created by a photographing unit, second image data transmitted from another transmission terminal, and display data received from the information providing device on a display screen; communicating the first image data, the second image data, and the display data with the other transmission terminal, wherein the other transmission terminal is connected to a communication network; capturing screen information displayed on the display screen; querying the other transmission terminal whether capturing of the screen information is allowed, determining that the other transmission terminal disallows capturing of the screen image when no response is received from the other transmission terminal within a predetermined time period after making the query; editing the screen information in regards to a response from the other transmission terminal; and storing the screen information, wherein the screen information is edited in regards to the response.

According to an embodiment of the present invention, a transmission system can be provided which can restrict capturing of a display screen of a transmission terminal.

Other objects, features and advantages of the present invention will become more apparent from the following detailed description when read in conjunction with the accompanying drawings.

BRIEF DESCRIPTION OF THE DRAWINGS

FIG. 7 is a diagram showing an example of a correspondence table between an area managed by a display control unit and display contents;

FIGS. 10A and 10B are diagrams illustrating an example of editing of the screen shot;

FIGS. 14A and 14B are diagrams illustrating examples of a system configuration of the transmission system for transmitting the screen shot to a data server;

DETAILED DESCRIPTION OF THE PREFERRED EMBODIMENTS

Hereinafter, an embodiment for implementing the present invention is explained by referring to the accompanying drawings. However, the technical scope of the present invention is not limited to the embodiment.

Figure 1:
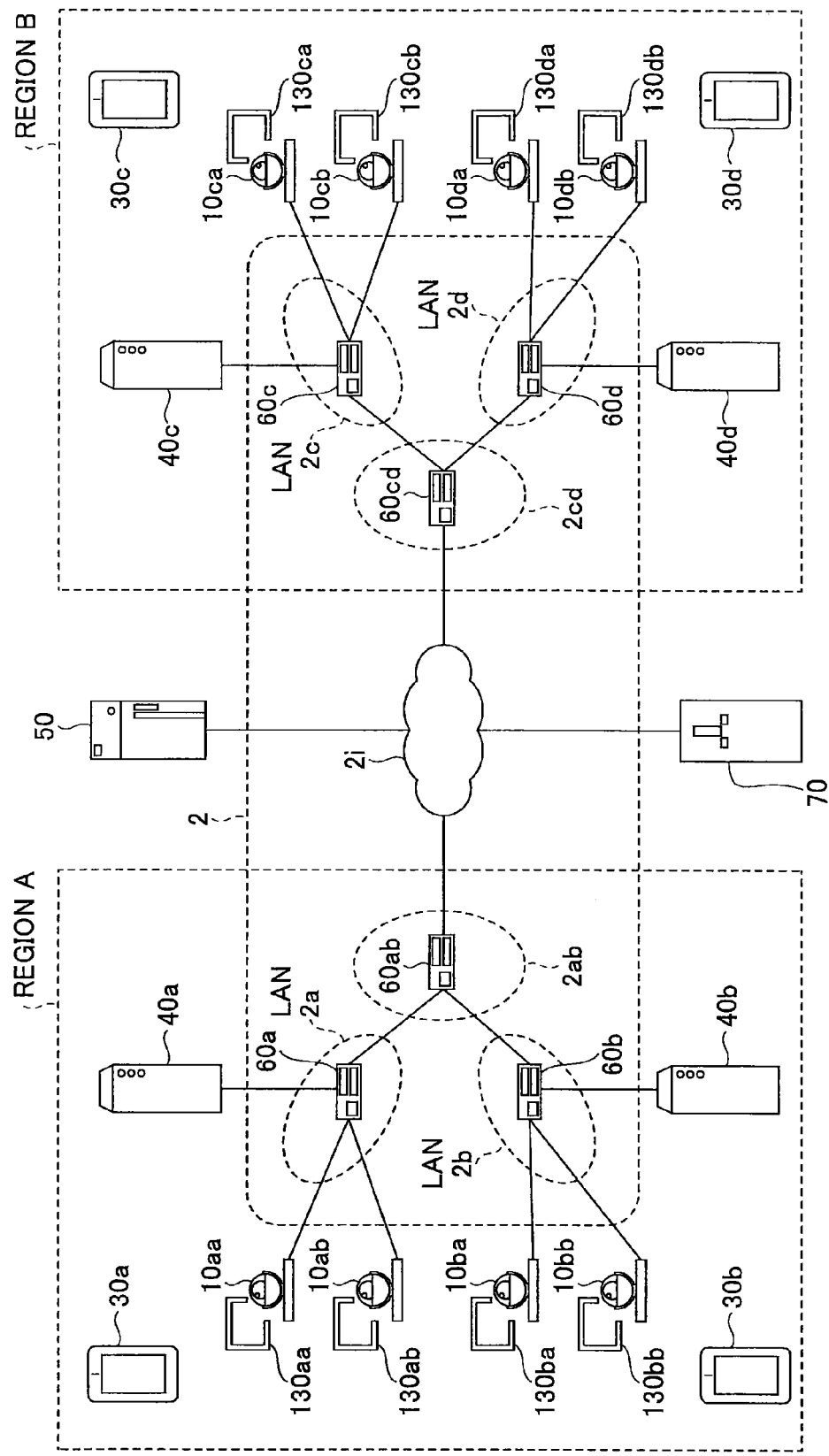
FIG. 1 is a diagram showing an example of a configuration of a transmission system according to an embodiment.

FIG. 1 is a diagram showing an example of a configuration of a transmission system according to the embodiment. An outline of the configuration is explained by referring to FIG. 1. In the embodiment, the transmission system 1 is explained, with which a teleconference can be conducted from remote locations separated by a certain distance.

The transmission system includes a data providing system that unidirectionally transmits content data from one transmission terminal to an other transmission terminal through a transmission management system, and a communication system that mutually transmits information and feelings amongst a plurality of transmission terminals through the transmission management system. The communication system is a system for mutually transmitting information and feelings amongst a plurality of communication terminals (which correspond to the "transmission terminals") through a communication management system (which corresponds to the "transmission management system"). Examples of the communication system include a video conference system, a voice conference system, a voice telephony system, and a personal computer (PC) screen sharing system.

In the embodiment, a video conference system is assumed as an example of the communication system, a video conference management system is assumed as an example of the communication management system, and a video conference terminal is assumed as an example of the communication terminal. Under these assumptions, the transmission system, the transmission management system, and the transmission terminal are explained. Namely, the transmission terminal and the transmission management system according to the embodiment may be applied not only to the video conference system, but also to the communication system or the transmission system.

The transmission system 1 shown in FIG. 1 includes a plurality of transmission terminals (10aa, 10ab, 10ba, 10bb, 10ca, 10cb, 10da, and 10db); displays for the corresponding transmission terminals (130aa, 130ab, 130ba, 130bb, 130ca, 130cb, 130da, and 130db); information providing devices (30a, 30b, 30c, and 30d) that provide information by cooperating with the corresponding transmission terminals; relay apparatuses (40a, 40b, 40c, and 40d); the transmission management system 50; routers (60a, 60b, 60ab, 60c, 60d, and 60cd); and a program providing system 70.

In the embodiment, the "transmission terminal 10" represents any transmission terminal among the transmission terminals (10aa, 10ab, 10ba, 10bb, 10ca, 10cb, 10da, and 10db), the "display 130" represents any display among the displays (130aa, 130ab, 130ba, 130bb, 130ca, 130cb, 130da, and 130db), the "information providing device 30" represents any information providing device among the information providing devices (30a, 30b, 30c, and 30d), the "relay apparatus 40" represents any relay apparatus among the relay apparatuses (40a, 40b, 40c, and 40d), and the "router 60" represents any router among the routers (60a, 60b, 60ab, 60c, 60d, and 60cd). Here, the number of the terminals or the number of the devices is not limited to the example of FIG. 1.

The transmission terminal 10 transmits and receives conference information, such as image data (which is imaging data or display data described later) or audio data, so as to communicate with another transmission terminal 10. Namely, in the embodiment, communication includes not only transmission and reception of voice data, but also transmission and reception of image data.

Here, the conference information may include, for example, something which is presented to participants of a conference (e.g., a product sample) during communication (a teleconference) executed by the transmission terminal 10; images of the participants; distribution documents; and document images which are not distributed, but displayed by a display device, such as a projector, other than the display 130 of the transmission terminal 10. The conference information means information that can be recognized by the participants at a location of the conference, if the conference is assumed to be a face-to-face conference. The conference information may be both image data and audio data. Alternatively, the conference information may be either the image data or the audio data. For example, when the conference information is only the image data, voices of the participants may be indicated in the image as captions. In the embodiment, a case is explained in which an image of the image data is a moving picture. However, the image of the image data may be a still picture. Alternatively, the image of the image data may include both a moving picture and a still picture.

The information providing device 30 is, for example, a portable device, such as a portable telephone device, a laptop PC, a smart phone, or a tablet computer. The information providing device 30 communicates with the transmission terminal 10 by using two types of communication methods. The communication ranges of the two types of communication methods are different. The information providing device 30 transmits (provides) display data representing a screen image which is displayed on a display 306 (which is described later) of the information providing device 30 to the transmission terminal 10. Here, the screen image is displayed by executing a predetermined software program (e.g., document creation software, spreadsheet software, or presentation software), which is installed in the information providing device 30 in advance. The screen image means data of a still picture or a moving picture displayed on the display 306 (which is described later) of the information providing device 30. In FIG. 1, one information providing device 30 is provided corresponding to one location (an office). However, the information providing device 30 can be connected to the transmission terminal 10 in any location, provided that a user (an owner) of the information providing device 30 moves to the corresponding location with the information providing device 30.

The relay apparatus 40 is a relay apparatus that relays communication between transmission terminals 10. Specifically, during communication (teleconferencing) which is conducted by using the transmission terminal 10, the relay apparatus 40 relays conference information that is communicated amongst a plurality of transmission terminals 10 to the corresponding transmission terminals 10. Additionally, when latency occurs for receiving conference information, such as imaging data, between the transmission terminal 10 and an other transmission terminal 10, which is the other party during the communication, the relay apparatus 40 reduces an information amount by changing resolution of image data, and subsequently the relay apparatus 40 transmits the image data to the transmission terminal 10, which is the other party.

In this manner, the latency can be resolved, and simultaneity of the conference and the conference information communication can be ensured. As a method of changing the resolution in accordance with a delay amount, a known technique may be used.

The transmission management system 50 centrally manages the transmission terminal 10 and the relay apparatus 40. Specifically, the transmission management system 50 centrally manages communication states of the transmission terminal 10 and the relay apparatus 40. For example, the transmission management system 50 communicates with the transmission terminal 10 and the relay apparatus 40, so as to manage registration of the transmission terminal 10 to the transmission system 1; so as to mange a terminal ID and an IP address of the transmission terminal 10; so as to manage billing for usage; so as to report other transmission terminals 10 with which each of the transmission terminals 10 can communicate; and so as to recognize an operation condition of each of the transmission terminals 10. Depending on necessity, the transmission management system 50 reports a condition of each of the transmission terminals 10 (e.g., not connected, currently logged in, or conference in progress) to other corresponding transmission terminals 10.

The router 60 is a router apparatus that interconnects networks. The router 60 selects an optimum path for communicating conference information (image data and audio data).

The program providing system 70 includes a hard disk (HD) (not shown) that stores a transmission terminal program that causes the transmission terminal 10 to achieve various types of functions or that causes the transmission terminal 10 to function as various types of units. The program providing system 70 can transmit the transmission terminal program to the transmission terminal 10. Additionally, the HD of the program providing system 70 stores an information providing device program that causes the information providing device 30 to achieve various types of functions or that causes the information providing device 30 to function as various units. The program providing system 70 can transmit the information providing device program to the information providing device 30. Further, the HD of the program providing system 70 stores a relay apparatus program that causes the relay apparatus 40 to achieve various types of functions or that causes the relay apparatus 40 to function as various types of units. The program providing system 70 can transmit the relay apparatus program to the relay apparatus 40. Furthermore, the HD of the program providing system 70 stores a communication management program that causes the transmission management system 50 to achieve various types of functions or that causes the transmission management system 50 to function as various types of units.

A LAN 2a connects the transmission terminals (10aa, and 10ab), the relay apparatus 40a, and the router 60a with each other, so that they can communicate with each other. A LAN 2b connects the transmission terminals (10ba, and 10bb), the relay apparatus 40b, and the router 60b with each other, so that they can communicate with each other. The LAN 2a and the LAN 2b are connected through a dedicated line 2ab including the router 60ab, so that they can communicate with each other. The LAN 2a and the LAN 2b are installed in a specified area A. For example, area A is Japan. The LAN 2a is installed in an office in Tokyo. The LAN 2b is installed in an office in Osaka.

A LAN 2c connects the transmission terminals (10ca, and 10cb), the relay apparatus 40c, and the router 60c with each other, so that they can communicate with each other. A LAN 2d connects the transmission terminals (10da, and 10db), the relay apparatus 40d, and the router 60d with each other, so that they can communicate with each other. The LAN 2c and the LAN 2d are connected with each other through a dedicated line 2cd including the router 60cd, so that they can communicate with each other. The LAN 2c and the LAN 2d are installed in a specified area B. For example, area B is the United States. The LAN 2c is installed in an office in New York. The LAN 2d is installed in an office in Washington D.C. Area A and area B are connected with each other by the Internet 2i through the corresponding routers (60ab, and 60cd), so that communication between area A and area B is enabled.

The transmission management system 50 and the program providing system 70 are connected to the transmission terminal 10 and the relay apparatus 40 by the Internet 2i, so that they can communicate with each other. The transmission management system 50 and the program providing system 70 may be installed in area A or area B. The transmission management system 50 and the program providing system 70 may be installed in an area other than area A or area B.

In the embodiment, a communication network 2 is formed by the LAN 2a, the LAN 2b, the dedicated line 2ab, the Internet 2i, the dedicated line 2cd, the LAN 2c, and the LAN 2d. The communication network 2 may include a portion in which communication is executed not only through a wired network, but also through a wireless network.

Figure 2:
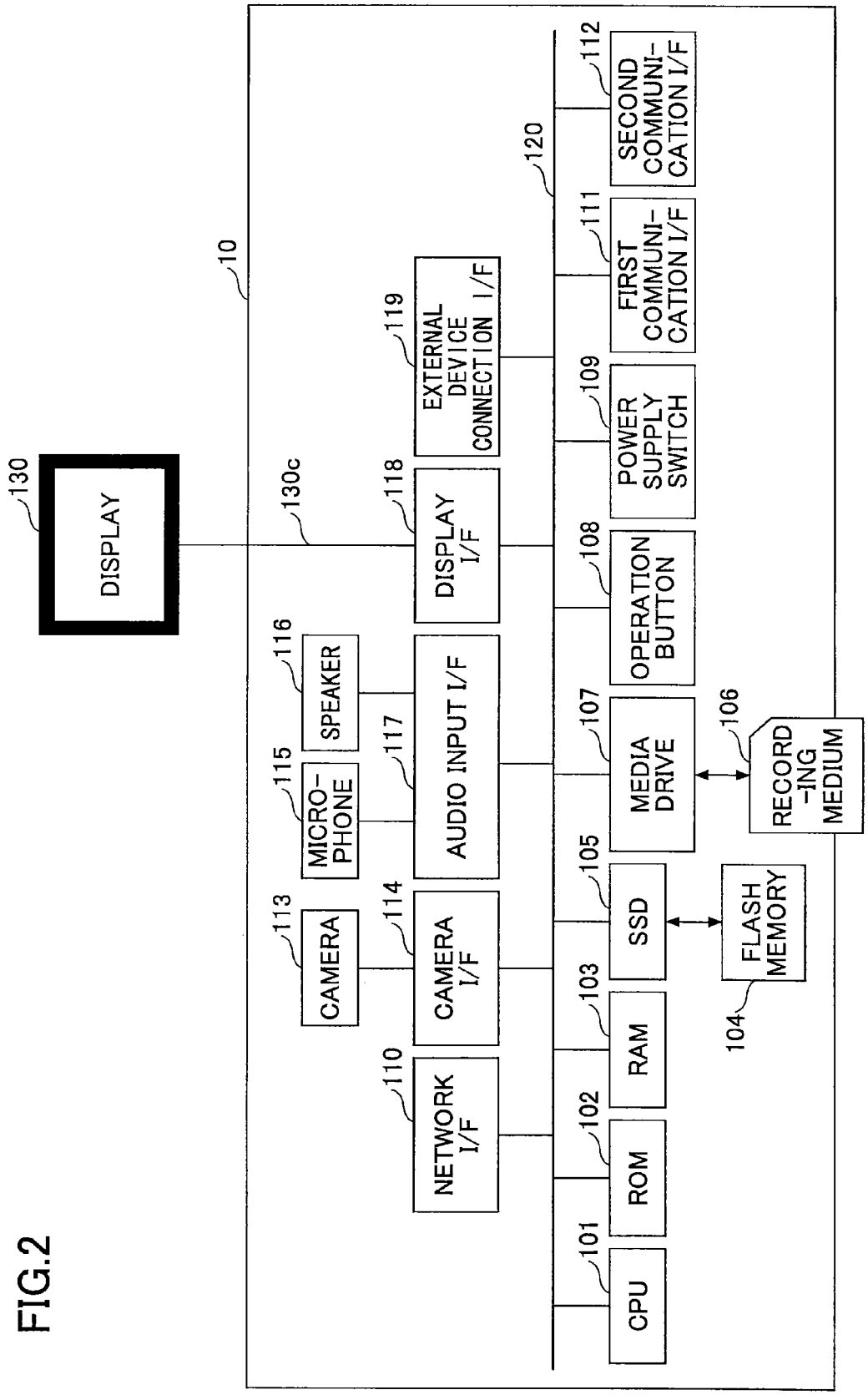
FIG. 2 is a diagram showing an example of a hardware configuration of a transmission terminal.

Next, a hardware configuration of the transmission terminal 10 is explained by referring to FIG. 2. FIG. 2 is a diagram showing an example of a hardware configuration of the transmission terminal 10. As shown in the figure, the transmission terminal 10 includes a Central Processing Unit (CPU) 101 that controls overall operations of the transmission terminal 10; a Read-Only Memory (ROM) 102 that stores various types of programs; a Random Access Memory (RAM) 103 that is used as a work area of the CPU 101; a Solid State Drive (SSD) 105 that controls reading and writing of various types of data with respect to a flash memory 104 under the control of the CPU 101; a media drive 107 that controls reading and writing of various types of data with respect to a recording medium 106, such as a memory card; an operation button 108, such as a cursor, that is operated, for example, for selecting a destination of the transmission terminal 10; a power supply switch 109 for turning on and turning off a power supply of the transmission terminal 10; and a network I/F 110 for transmitting data by using the communication network 2.

The transmission terminal 10 includes a first communication I/F 111 and a second communication I/F 112 as a communication interface for transmitting various types of data to and receiving various types of data from the information providing device 30. The first communication I/F 111 is a communication interface conforming to a radio communication standard for a contactless IC chip, which is referred to as "Near Field Communication (NFC)." The second communication I/F 112 is a communication interface conforming to Bluetooth (registered trademark) communication standard.

The transmission terminal 10 includes a camera 113 that photographs, for example, an image of a party of a conference and outputs image data; and a camera I/F 114 that drives the camera 113 and that communicates the image data photographed by the camera 113. The camera 113 includes a built-in image sensor, such as a Complementary Metal Oxide Semiconductor (CMOS) or a Charge Coupled Device Image Sensor (CCD), that photographs an object and obtains image data, under control of the CPU 101. The camera 113 is connected to the camera I/F 114 through, for example, a Universal Serial Bus (USB) cable.

The transmission terminal 10 includes an audio input I/F 117 that processes input and output of an audio signal through a microphone 115 and a speaker 116, under the control of the CPU 101. The microphone 115 and the speaker 116 are connected to the audio input I/F 117 through a USB cable, for example. The sound collected by the microphone 115 may be the sound in the vicinity of the transmission terminal 10 itself (e.g., voice of an operator of the transmission terminal). The sound output by the speaker 116 may be the sound which is transmitted from an other communication terminal 10 (e.g., the voice of an operator of the other transmission terminal 10).

The transmission terminal 10 includes a display I/F 118 that transmits image data to a display 130 under the control of the CPU 101. The display 130 is connected to the display I/F 118 by a cable 130c. The cable 130c may be a cable for an analog RGB (VGA) signal, a component video cable, a cable for a High-Definition Multimedia Interface (HDMI) signal, or a cable for a Digital Video Interactive (DVI) signal.

In the embodiment, the display 130 is connected to the display I/F 118. However, the embodiment is not limited to this. For example, the transmission device 10 can be connected to a video output device including a projector or the like.

The transmission terminal 10 includes an external device connection I/F 119 for connecting an external device. An external device, such as an external camera, an external microphone, or an external speaker, can be connected to the external device connection I/F 119 through a Universal Serial Bus (USB) cable, for example. When an external camera is connected, the external camera is preferentially driven instead the built-in camera 113, in accordance with the control of the CPU 101. Similarly, when an external microphone or an external speaker is connected, the external microphone or the external speaker is preferentially driven instead of the built-in microphone 115 or the built-in speaker 116.

The transmission terminal 10 includes a bus line 120, such as an address bus or a data bus, for electrically connecting the above-described elements as shown in FIG. 2.

The recording medium 106 can be attached to and detached from the transmission terminal 10. In the embodiment, the flash memory 104 is used. However, instead of the flash memory 104, a non-volatile memory, such as an electrically erasable and programmable ROM (EEPROM), may be utilized, provided that data can be read from and written to the non-volatile memory in accordance with the control of the CPU 101. The display 130 is a display unit that is formed of, for example, a liquid crystal display or an organic electroluminescence display for displaying an image of an object or an icon for operations.

The transmission terminal program 232 that is executed by the transmission terminal 10 can be stored in a non-transitory computer readable recording medium, such as the recording medium 106, as an installable file or an executable file. The transmission terminal program 232 may be provided by distributing such a non-transitory computer readable recording medium. The transmission terminal program 232 may be stored in the ROM 102, instead of the flash memory 104. The transmission terminal program 232 may be downloaded from the program providing system 70 through the network I/F 110. Then, the transmission terminal program 232 may be stored in the flash memory 104 or the recording medium 106.

Figure 3:
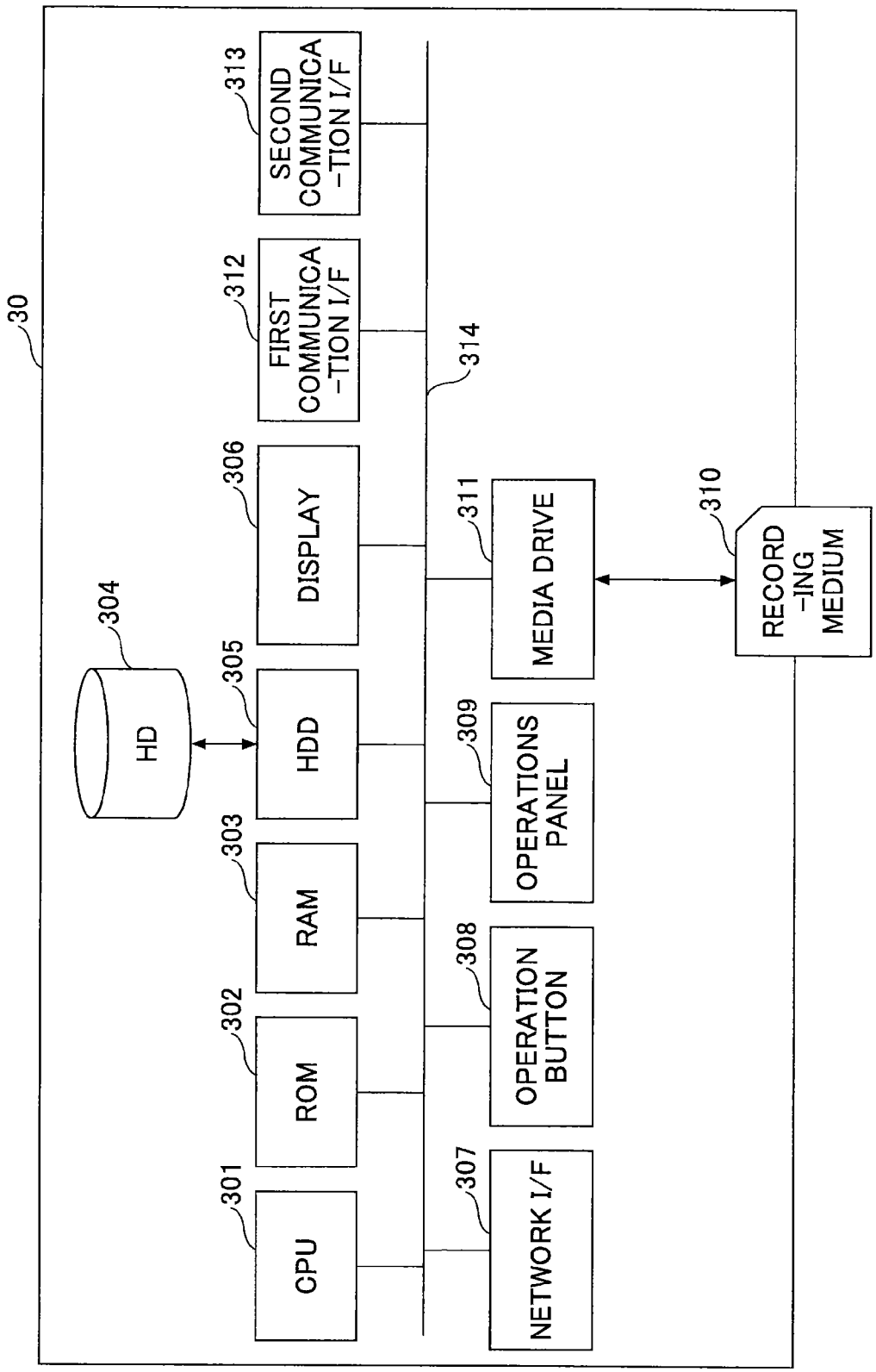
FIG. 3 is a diagram showing an example of a hardware configuration of an information providing device.

Next, a hardware configuration of the information providing device 30 is explained by referring to FIG. 3. FIG. 3 is a diagram showing an example of a hardware configuration of the information providing device 30. As shown in the figure, the information providing device 30 includes a CPU 301 for controlling overall operations of the information providing device 30; a ROM 302 that stores various types of programs for driving the CPU 301; a RAM 303 that is used as a work area of the CPU 301; a Hard Disk (HD) 304 that stores various types of data such as the information providing device program; a Hard Disk Drive (HDD) 305 that controls reading and writing of various types of data with respect to the HD 304, under control of the CPU 301; a display 306 that includes, for example, a liquid crystal display or an organic electro-luminescence display for displaying various types of display information, such as a cursor, a menu, a window, a character, or an image; a network I/F 307 for transmitting data by using the communication network 2; an operation button 308 for selecting or executing various types of commands, selecting a target to be processed, or moving a cursor; an operations panel 309 for selecting and executing various types of commands, selecting a target to be processed, or moving a cursor through a touch panel; and a media drive 311 for controlling reading data or writing data to a recording medium 310, such as a flash memory.

The information providing device 30 includes a first communication I/F 312 and a second communication I/F 313 as a communication interface for communicating various types of data with the transmission terminal 10. The first communication I/F 312 is a communication interface conforming to the radio communication standard for a contactless IC chip, which is referred to as "Near Field Communication (NFC)." The second communication I/F 313 is a communication interface conforming to Bluetooth (registered trademark) communication standard.

The information providing device 30 includes a bus line 314 such as an address bus or a data bus which electrically connects the above-described elements as shown in FIG. 3. The recording media 310 can be attached to and detached from the information providing device 30.

The information providing device program which is executed by the information providing device 30 may be stored in a non-transitory computer readable recording medium, such as the recording medium 310, as an installable file or an executable file. The information providing device program may be provided by distributing the non-transitory computer readable recording medium. The information providing device program may be stored in the ROM 302, instead of the HD 304. The information providing device program may be downloaded from the program providing system 70 through the network I/F 307, and the information providing device program may be stored in a non-transitory computer readable recording medium, such as the HD 304 or the recording medium 310. The information providing device program stored in a storage unit 23 of the transmission terminal 10 may be received by the information providing device 30, and the information providing device 30 may execute the information providing device program.

The relay apparatus 40, the transmission management system 50, and the program providing system 70 are server apparatuses, and they have a configuration of a computer (not shown), similar to that of the information providing device 30. Each of the CPUs included in the relay apparatus 40, the transmission management system 50, and the program providing system 70 achieves functions of the corresponding device by executing programs stored in a storage medium included in the device itself, or by executing programs provided from the program providing system 70.

Figure 4:
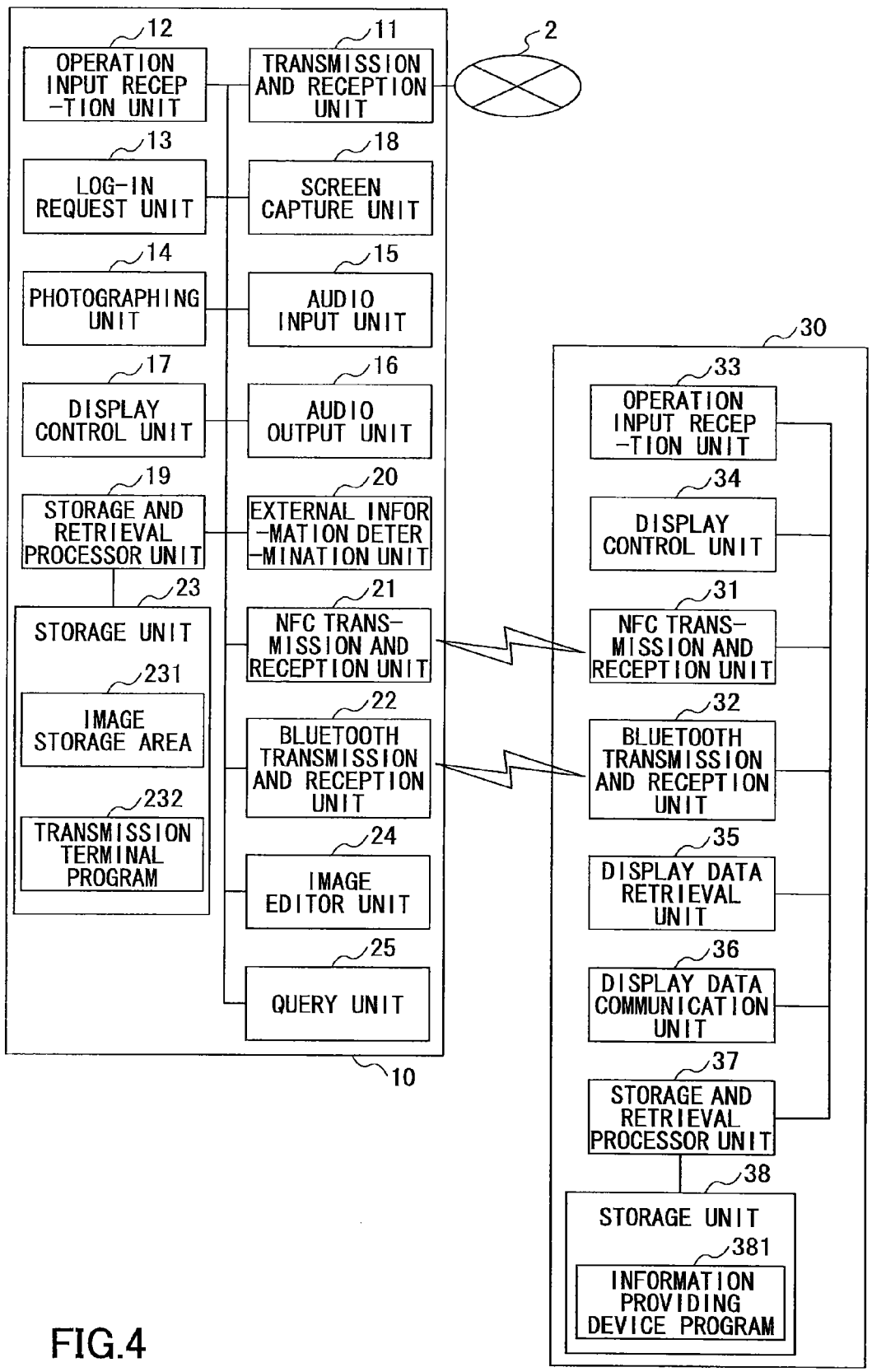
FIG. 4 is a block diagram showing functional configurations of the transmission terminal and the information providing device.

Next, functional configurations of the transmission terminal 10 and the information providing device 30 are explained. FIG. 4 is a block diagram showing functional configurations of the transmission terminal 10 and the information providing device 30.

As shown in FIG. 14, the transmission terminal 10 includes a transmission and reception unit 11; an operation input reception unit 12; a log-in request unit 13; a photographing unit 14; an audio input unit 15; an audio output unit 16; a display control unit 17; a screen capture unit 18; a storage and retrieval processor unit 19; an external information determination unit 20; an NFC transmission and reception unit 21; a Bluetooth transmission and reception unit 22; an image editor unit 24; and a query unit 25. Each of the above-described units is a function that is achieved by any element among the elements shown in FIG. 2 which operates in accordance with a command from the CPU 101 operating in accordance with the transmission terminal program expanded in the RAM 103. The transmission terminal 10 includes the storage unit 23, which is formed of the SSD 105 shown in FIG. 2.

The transmission and reception unit 11 of the transmission terminal 10 is achieved by a command from the CPU 101 shown in FIG. 2 and the network I/F 110 shown in FIG. 2. The transmission and reception unit 11 communicates various types of data (information) with another terminal, a device, or a system through the communication network 2. When communication with another transmission terminal 10 being the other party of the conference is established through the relay apparatus 40, the transmission and reception unit 11 manages a terminal ID of the transmission terminal 10, which becomes the other party of the communication (the other party of the conference), by registering the terminal ID of the other transmission terminal in a management table (not shown) stored in the storage unit 23. The management table is described later. The terminal ID of the transmission terminal 10 is, for example, a host name (name), an IP address, a number, an identifier, or identification information with which the transmission terminal 10 can be identified. The terminal ID may be assigned to a user of the transmission terminal 10.

The operation input reception unit 12 is achieved by a command from the CPU 101 shown in FIG. 2, the operation button 108 shown in FIG. 2, and the power supply switch 109 shown in FIG. 2. The operation input reception unit 12 receives various types of inputs from an operator of the transmission terminal 10. For example, for a case in which an operator selects a transmission terminal 10 of the other party of a conference, when the transmission terminal 10 which is used by the other party of the conference is selected by a cursor key in a selection screen for selecting the other party of the conference (not shown), which is displayed on the display 130, and a selection button is pressed, a terminal ID and an IP address of the selected transmission terminal 10 are received by the operator as information of the other party of the conference. When an arrangement and a size of image data (a layout) displayed on the screen is to be changed, the operation input reception unit 12 receives information which controls the change from an operator of the transmission terminal 10 itself through the operation button 108, for example.

The log-in request unit 13 is achieved by a command from the CPU 101 shown in FIG. 2. The log-in request unit 13 automatically transmits, from the transmission and reception unit 11, log-in request information for requesting log-in of the transmission terminal 10 itself and the current IP address of the transmission terminal 10 itself to the transmission management system 50 through the communication network 2. The log-in request information includes, at least, the terminal ID. The transmission management system 50 manages the log-in request information (the terminal ID) and the IP address, which are transmitted from the corresponding transmission terminal 10. Here, it is assumed that, when the power supply of the transmission terminal 10 is turned on, the log-in request information and the IP address are automatically transmitted to the transmission management system 50. The transmission of the log-in request information and the IP address may be executed in accordance with an operation of a user with respect to the transmission terminal 10.

The photographing unit 14 is achieved by a command from the CPU 101 shown in FIG. 2, the camera 113 shown in FIG. 2, and the camera I/F 114 shown in FIG. 2. The photographing unit 14 photographs, for example, an image of a conference room including an image of a participant (which is an object). The photographing unit 14 outputs imaging data obtained by this photographing.

The audio input unit 15 is achieved by a command from the CPU 101 shown in FIG. 2, and the audio input I/F 117. The audio input unit 15 generates audio data by converting sound in the vicinity of the transmission terminal 10 collected by the microphone 115 into an audio signal. The audio output unit 16 is achieved by a command from the CPU 101 shown in FIG. 2, and the audio input I/F 117 shown in FIG. 2. The audio output unit 16 outputs sound from the speaker 116 by outputting the audio data or the like which is transmitted from another transmission terminal 10 through the speaker 116.

The display control unit 17 is achieved by a command from the CPU 101 shown in FIG. 2 and the display I/F 118 shown in FIG. 2. The display control unit 17 transmits image data (the imaging data and/or the display data) to the display 130, and the display control unit 17 executes control for displaying the data.

The storage and retrieval processor unit 19 is achieved by a command from the CPU 101 shown in FIG. 2, and the SSD 105 shown in FIG. 2. The storage and retrieval processor unit 19 stores various types of data in the storage unit 23, or reads out various types of data stored in the storage unit 23. The transmission terminal program 232 for achieving the functions of the transmission terminal 10 is stored in the storage unit 23. In the storage unit 23, an image storage area 231 is reserved. The image storage area 231 is an area for storing a screen shot of a display screen of the display 130.

The external information determination unit 20 is achieved by the CPU 101 shown in FIG. 2. The external information determination unit 20 determines whether there is transmission or reception of data from the information providing device 30, which is disposed outside the transmission terminal 10.

The NFC transmission and reception unit 21 is achieved by a command from the CPU 101 shown in FIG. 2 and the first communication I/F 111 shown in FIG. 2. The NFC transmission and reception unit 21 executes contactless communication (which is referred to as "NFC communication," hereinafter) with a NFC transmission and reception unit 31 of the information providing device 30 in accordance with contactless communication of the NFC standard.

The Bluetooth transmission and reception unit 22 is achieved by a command from the CPU 101 shown in FIG. 2 and the second communication I/F 112 shown in FIG. 2. The Bluetooth transmission and reception unit 22 executes radio communication with the information providing device 30 in accordance with Bluetooth (registered trademark) communication standard, which is a standard for a short-range radio communication.

In the embodiment, the communication I/F conforming to Bluetooth (registered trademark) communication standard is used as the second I/F 112. However, the embodiment is not limited to this. For example, a communication I/F conforming to another standard, such as a communication I/F conforming to the Wireless Fidelity (Wi-Fi) standard (e.g., IEEE 802.11a and/or IEEE 802.11b) may be utilized. In this case, a Wi-Fi transmission and reception unit may be formed of a network board conforming to the IEEE 802.11a/b/g/n standards that transmits and receives data, and a communication control unit (a communication control program) that establishes radio communication and that controls transmission and reception of data. Further, the Ultra Wide Band (UWB) communication standard may be adopted as a radio communication standard. According to the UWB communication standard, when a distance between devices is less than or equal to 3 m, communication can be executed at a data rate of 480 Mbps, which is equivalent to that of USB 2.0 for a wired communication. Here, the transmission terminal 10 and the information providing device 30 may be connected through a cable, such as a USB cable, instead of radio communication.

The screen capture unit 18 saves a display screen of the display 130 and creates a screen shot. The screen shot is image data of a still picture conforming to JPEG or Bitmap, for example.

When a user of the transmission terminal 10 performs an operation to capture a screen shot, the query unit 25 inquires of an other transmission terminal, which is registered in the management table, as to whether the capture of the screen shot is allowed.

The image editor unit 24 edits image data (e.g., imaging data and/or display data) transmitted from the transmission terminal of the user who disallows capturing, by displaying the image data in black or replacing the image data with another image.

Next, the information providing device 30 is explained. As shown in FIG. 4, the information providing device 30 includes the NFC transmission and reception unit 31, a Bluetooth transmission and reception unit 32, an operation input reception unit 33, a display control unit 34, a display data retrieval unit 35, a display data communication unit 36, and a storage and retrieval processor unit 37. Each of these units is a function that is achieved by some elements shown in FIG. 3 operating in accordance with a command from the CPU 301, which is in accordance with the information providing device program 381 expanded in the RAM 303. Additionally, the information providing device 30 includes a storage unit 38 which is formed of the HDD 305 shown in FIG. 3.

The NFC transmission and reception unit 31 is achieved by a command from the CPU 301 shown in FIG. 3 and the first communication I/F 312 shown in FIG. 3. The NFC transmission and reception unit 31 executes contactless communication with the NFC transmission and reception unit 21 of the transmission terminal 10 in accordance with the NFC communication.

The Bluetooth transmission and reception unit 32 is achieved by a command from the CPU 301 of FIG. 3 and the second communication I/F 313 shown in FIG. 3. When communication between the Bluetooth transmission and reception unit 32 and the Bluetooth transmission and reception unit 21 of the transmission terminal 10 is established, the Bluetooth transmission and reception unit 32 transmits display data retrieved by the display data retrieval unit 35 (described later) to the transmission terminal 10. The Bluetooth transmission and reception unit 32 also receives information indicating a shared state of the display data from the transmission terminal 10.

The operation input reception unit 33 is achieved by a command from the CPU 301 shown in FIG. 3, the operation button 308 shown in FIG. 3, and the operations panel 309 shown in FIG. 3. The operation input reception unit 33 receives an input by an operation of a user.

The display control unit 34 is achieved by a command from the CPU 301 shown in FIG. 3, and the display 306 shown in FIG. 3. The display control unit 34 causes the display 306 to display various types of information, such as a cursor, a menu, a window, a character, or an image.

The display data retrieval unit 35 is achieved by cooperation between the CPU 301 shown in FIG. 3 and the information providing program 381 stored in the storage unit 23 of the transmission terminal 10. The display data retrieval unit 35 retrieves display data of various types of information. Here, the display control unit 34 causes the display 306 to display the various types of information.

The display data communication unit 36 is achieved by the CPU 301 shown in FIG. 3, and the second communication I/F 313 shown in FIG. 3. The display data communication unit 36 transmits the display data retrieved by the display data retrieval unit 35 to the transmission terminal 10 through the Bluetooth transmission and reception unit 32. Additionally, the display data communication unit 36 receives various types of information, which are transmitted in regards to a state change from the transmission terminal 10.

The storage and retrieval processor unit 37 is achieved by a command from the CPU 301 shown in FIG. 3, and the HDD 305 shown in FIG. 3. The storage and retrieval processor unit 37 stores various types of data in the storage unit 38, and reads out various types of data stored in the storage unit 38. The storage unit 38 stores, in advance, the information providing device program 38 for achieving the functions of the information providing device 30, data such as image data of materials to be shared during a conference (which is referred to as "conference material data," hereinafter), and various types of programs for displaying the conference material data (e.g., a word processing program, a spreadsheet program, and a presentation program).

[Display Screen of the Display 130]

Hereinafter, there is explained the display screen which is displayed on the display 130 of the transmission terminal 10 of the transmission system 1. As data which is displayed on the display 130 of the transmission terminal 10 at a location of a teleconference, imaging data which is photographed by the camera 113 and display data transmitted from the information providing device 30 can be considered. Here, the imaging data means image format data which is photographed by the camera 113 of the transmission terminal 10 and that of an other transmission terminal 10. The display data is data representing the screen which is displayed on the display 306 connected to the information providing device 30 or another transmission terminal 10.

Figure 5A:
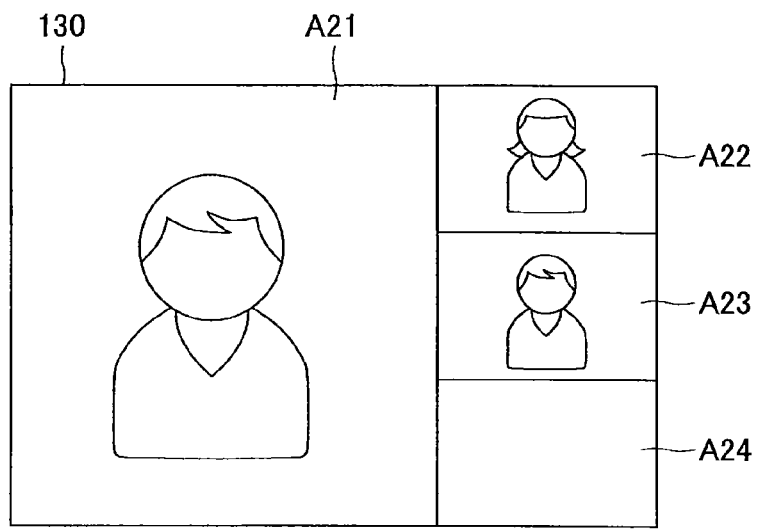
FIGS. 5A-5C are diagrams showing examples of a display screen displayed on a display of the transmission terminal.
Figure 5B:
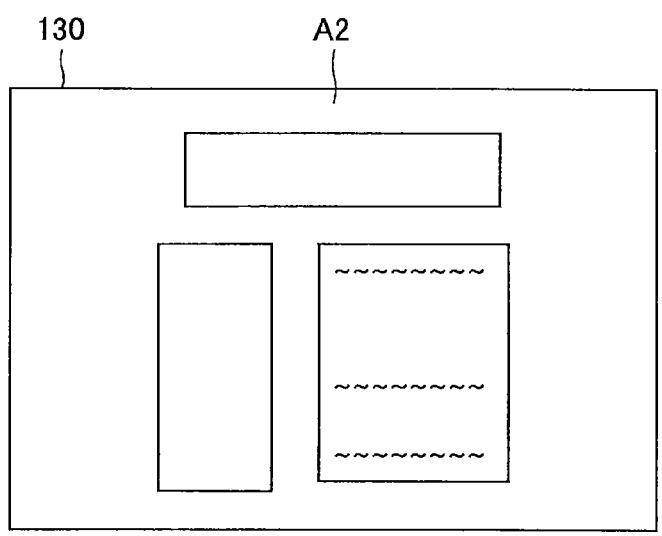
Figure 5C:
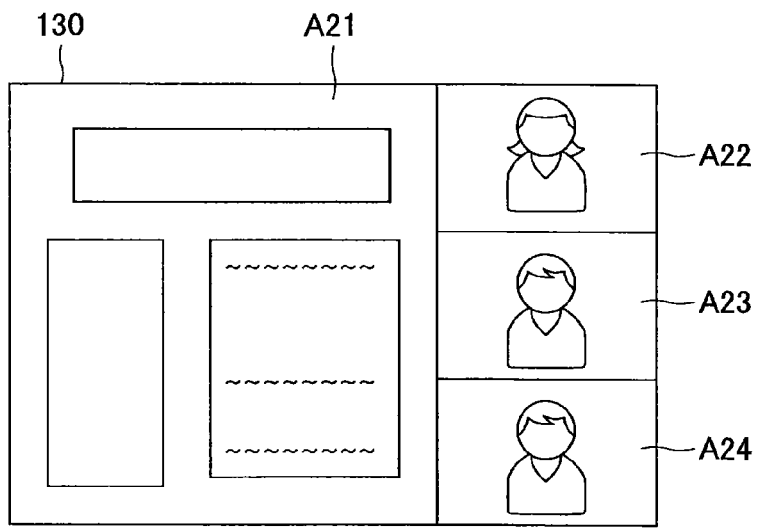

FIGS. 5A-5C are diagrams showing examples of the display screen displayed on the display 130 of the transmission terminal 10. FIG. 5A shows an example in which one screen is divided into four regions A21-A24. The large region from the left side to the center (a first display region) is denoted as a display region A21. The small regions (a second display region) from the upper right portion to the lower right portion of the screen are denoted as a display region A22 to a display region A24, respectively. In the layout of FIG. 5A, for example, imaging data of the transmission terminal 10, in which a participant of the conference is speaking to the microphone 115, is assigned to the display region A21.

In FIG. 5B, the display data is displayed on the display 130 of the transmission terminal 10 by the information providing device 30. The display data is displayed as a display screen. When the display data is transmitted from the information providing device 30, the display data is displayed across the entire screen by assigning the display data to the entire screen (a display region A2) as shown in FIG. 5B.

In FIG. 5C, the display data of the information providing device 30 is displayed by assigning it to the display region A21. At the same time, imaging data of each of the transmission terminals 10 is displayed by assigning the corresponding regions in order from the display region A22. In this manner, the display data can be arranged at a position close to the center of the display screen, and the display data can be displayed in a larger size relative to other images. Accordingly, visibility of a presentation material or the like can be enhanced, and the presentation material or the like can be highlighted. For the layout of FIG. 5C, for example, a transmission start button (described later) is pressed last, and the display data of the information providing device 30 is assigned to the display region A21.

When a user presses a predetermined button (e.g., a cursor key) of the transmission terminal 10, and an input from the predetermined button is received by the operation input reception unit 12, the display control unit 17 switches the screen in a manner, such as FIG. 5A→FIG. 5B→FIG. 5C→FIG. 5A.

Next, capture of a screen shot of the display screen is explained.

Figure 6A:
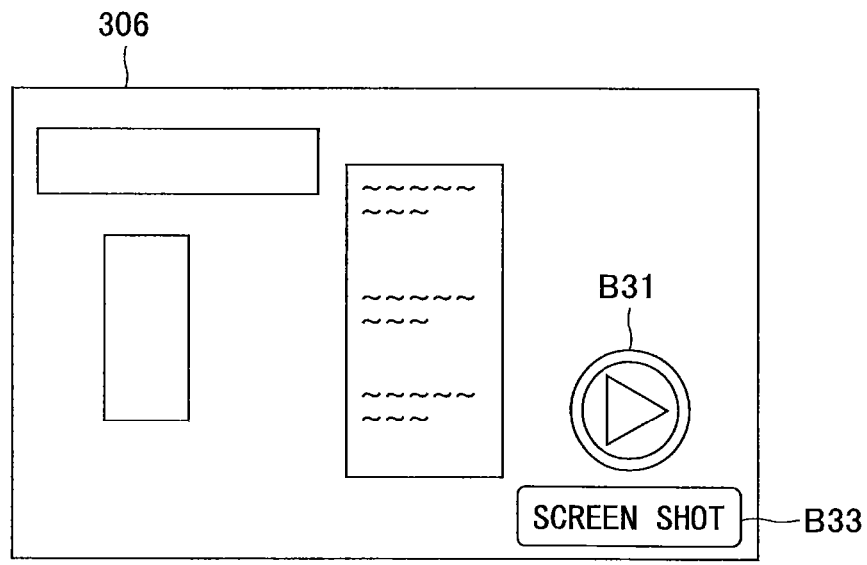
FIGS. 6A and 6B are diagrams showing examples of the display screen when communication is established between the transmission terminal and an other transmission terminal, and display data of a computer is shared between the transmission terminals.
Figure 6B:
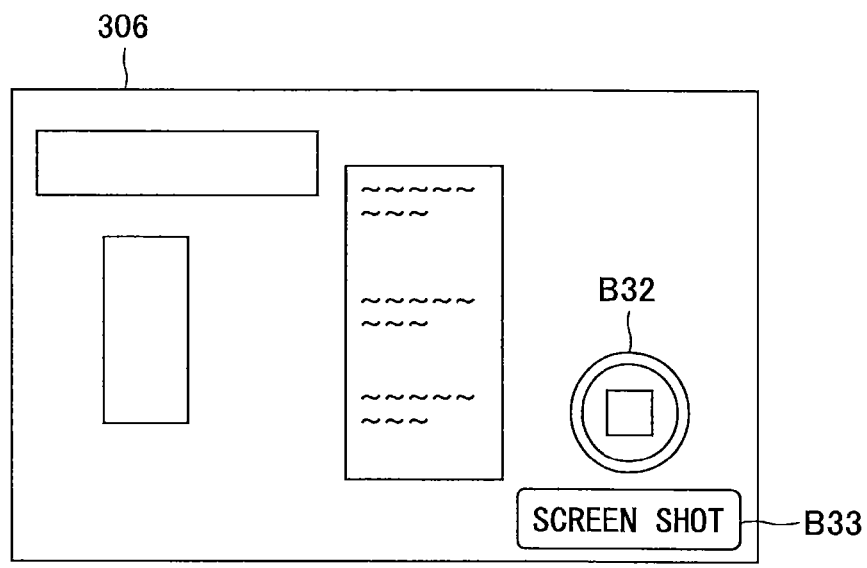

FIGS. 6A and 6B shows display examples of the display 306 for a case in which communication between transmission terminals 10 is established, and the transmission terminals 10 share display data of the information providing device 30. The display control unit 34 displays the transmission start button B31 and a screen shot button B33 on the display 306 of the information providing device 30, which is transmitting the display data. The transmission start button B31 is a button for a user to command the information providing device 30 to start transmission of the display data to the transmission terminal 10. The screen shot button B33 is a button for commanding the transmission terminal 10 to create a screen shot.

As shown in FIG. 6B, when a user presses the transmission start button B31, a transmission interruption button B32 is displayed. The transmission interruption button B32 is a button for a user to command the information providing device 30 to interrupt transmission of the display data. When a user presses the transmission interruption button B32, the transmission start button B31 is displayed. The screen shot button B33 is displayed regardless of whether the transmission start button B31 is displayed or the transmission interruption button B32 is displayed.

A user may cause the transmission terminal 10 to create a screen shot of the display screen, while operating the information providing device 30. Namely, a user can create a screen shot without pressing a button of the transmission terminal 10.

Here, instead of displaying the screen shot button B33 on the display 306 of the information providing device 30, the screen shot button B33 may be displayed on the display 130 of the transmission terminal 10. Alternatively and/or additionally, a hardware switch may be provided in the transmission terminal 10 as an operation reception unit for taking a screen shot.

When a user presses or clicks the screen shot button B33, the operation input reception unit 33 receives an operation to create a screen shot. With this, the NFC transmission and reception unit 31 or the Bluetooth transmission and reception unit 32 transmits a request for capturing a screen shot to the transmission terminal 10. The screen capture unit 18 of the transmission terminal 10 creates a screen shot by capturing the display screen. Depending on necessity, the screen capture unit 18 of the transmission terminal 10 edits the screen shot, and stores the screen shot in the image storage area 231.

The screen shot button B33 of FIGS. 6A and 6B are displayed regardless of whether the display screen displayed on the display 130 by the transmission terminal 10 is any one of FIGS. 5A to 5C. Namely, a user may always use the function of the screen shot (the screen shot button B33 may always be displayed on the display 306).

The following modes are examples of a layout such that a portrait of a participant of a conference is displayed on the display 130.

Full screen (another party's image) mode

PandP mode (images of participating locations including the operator's location are arranged in windows the same size)

PinP mode (the operator's image is displayed in a small window at a lower right portion of the PandP mode, which does not include the own location)

Multi-view mode (another party's image is displayed as a main image, while images of other locations (including the operator's location) are displayed in small windows at an upper right portion, a middle right portion, and a lower right portion)

PC screen multi-view mode (a multi-view mode in which a shared PC screen is a main image)

FIG. 5A is an example of the multi-view mode. FIG. 5C is an example of the PC screen multi-view mode. FIG. 5B is an example of the full screen mode not including portraits. FIG. 15B shows an example of the PandP mode and the PinP mode.

The display control unit 17 of the transmission terminal 10 manages information displayed on corresponding regions in each of the modes. Even if the number and sizes of regions are different, imaging data displayed in each of the regions is managed by the display control unit 17 of the transmission terminal 10.

FIG. 7 is a diagram showing an example of a correspondence table between the regions and the display contents, which is managed by the display control unit 17. For each of the regions A21 to A24, the transmission terminal 10 and the display content are associated and registered. Accordingly, the query unit 25 can retrieve the terminal ID of the transmission terminal 10, which displays the image data (e.g., imaging data, or display data), from the display control unit 17.

Figure 8:
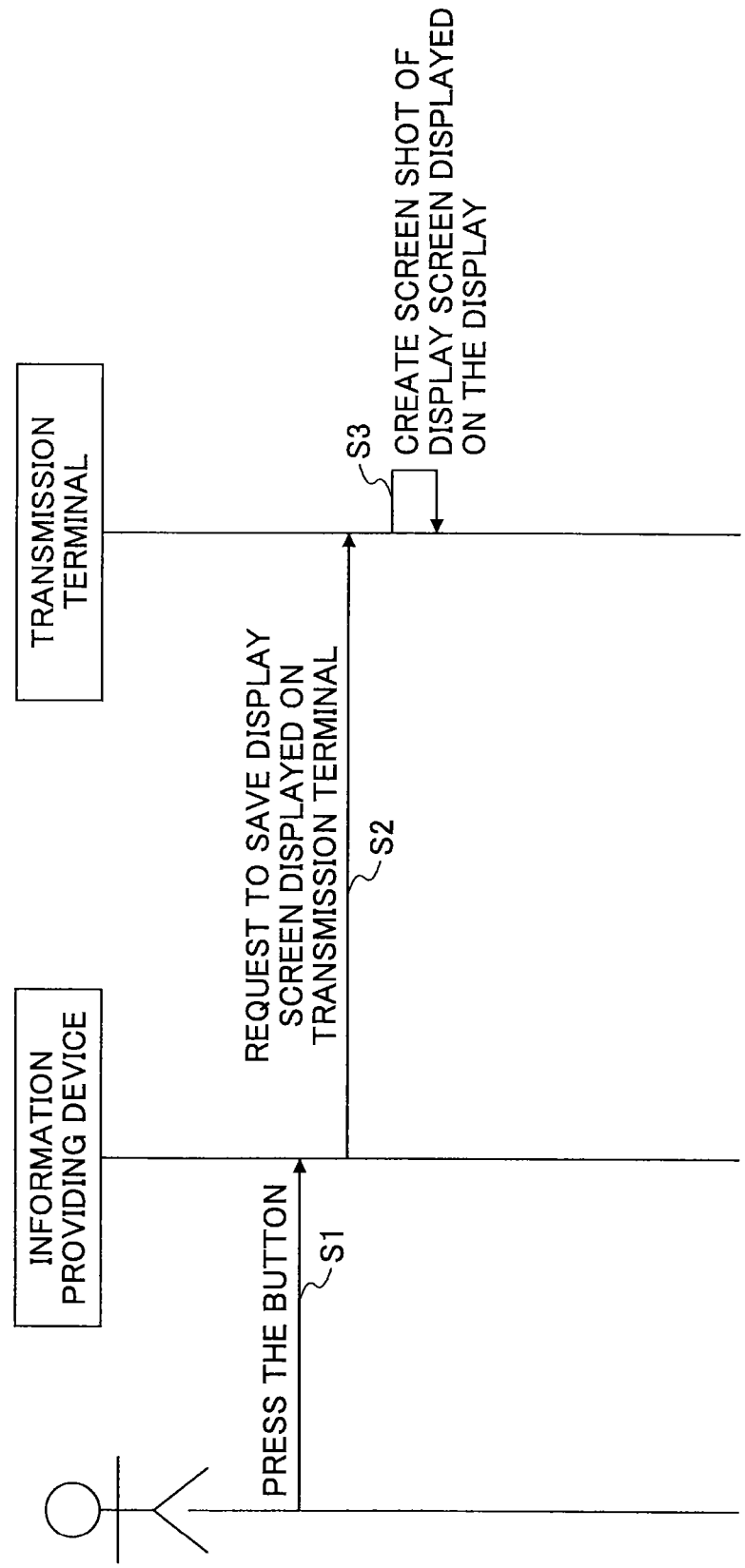
FIG. 8 is a sequence diagram showing an example of a procedure of the information providing device for requesting a screen shot from the transmission terminal.

FIG. 8 is a sequence diagram showing an example of a procedure of the information providing device 30 to request the transmission terminal 10 for a screen shot.

S1: A user presses the button B33.

S2: The NFC transmission and reception unit 31 or the Bluetooth transmission and reception unit 32 requests the transmission terminal 10 to save a display screen, which is displayed on the display 130.

S3: The screen capture unit 18 captures a screen shot of the display screen, which is displayed on the display 130 (which is temporarily saved, and the screen shot may be edited after querying the other transmission terminal 10).

[Query]

Figure 9:
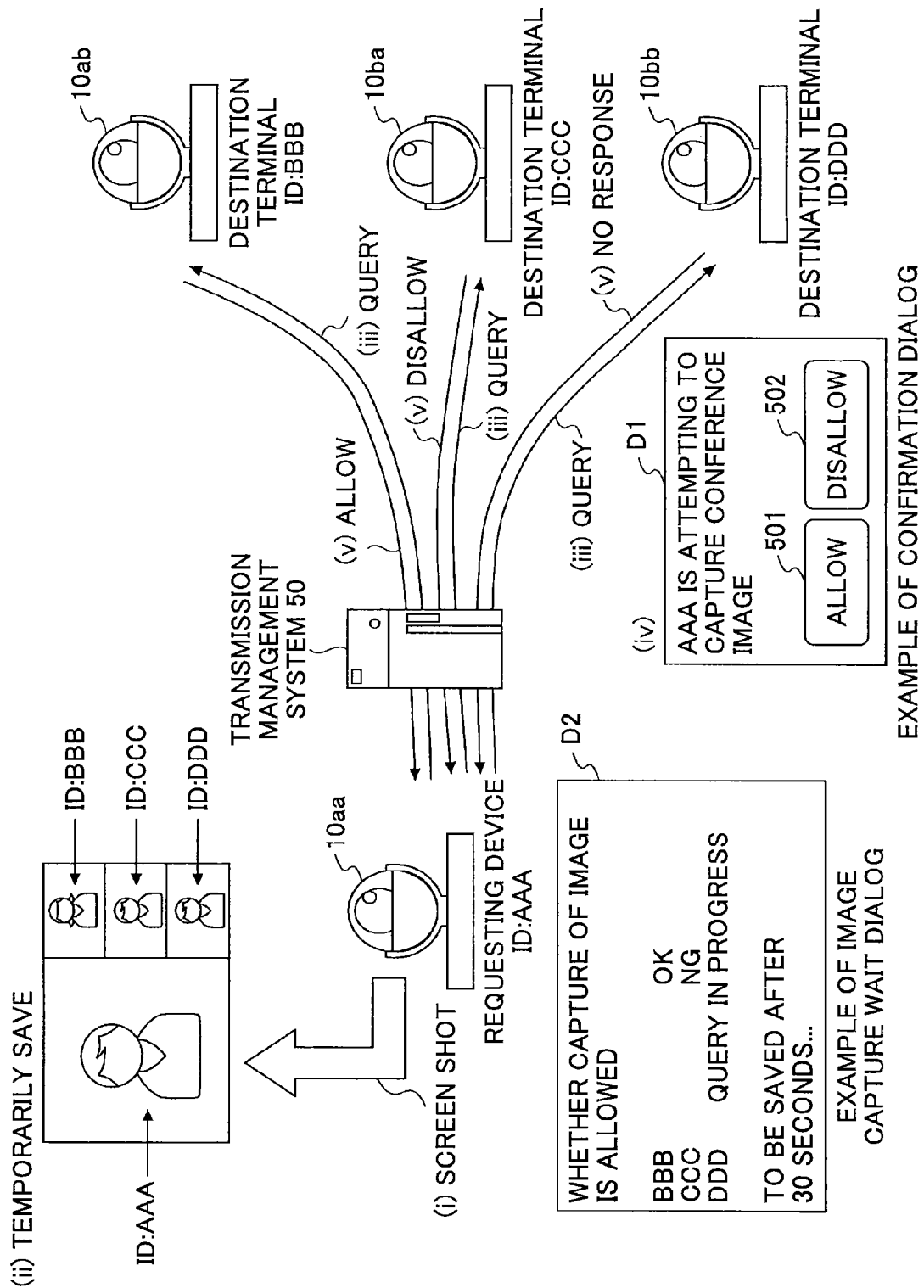
FIG. 9 is a diagram illustrating an example of a query from the transmission terminal to the other transmission terminal.

FIG. 9 is a diagram illustrating an example of a query from the transmission terminal 10 to an other transmission terminal 10. The transmission terminal 10aa establishes sessions with the transmission terminals 10ab, 10ba, and 10bb. The transmission terminal 10aa communicates image data (e.g., imaging data and/or display data) and audio data with the transmission terminals 10ab, 10ba, and 10bb. The transmission terminal 10aa shares the display data with the transmission terminals 10ab, 10ba, and 10bb. In the transmission management system 50, the transmission terminals 10, which are currently executing a conference (or which are establishing the sessions), are associated and registered. Here, the terminal ID (which is denoted as "ID" in the figure) of the transmission terminal 10aa is assumed to be AAA, the terminal ID of the transmission terminal 10ab is assumed to be BBB, the terminal ID of the transmission terminal 10ba is assumed to be CCC, and the terminal ID of the transmission terminal 10bb is assumed to be DDD.

(i) In FIG. 9, it is assumed that a user of the transmission terminal 10aa presses the screen shot button B33 in the layout of FIG. 5A.

(ii) When the transmission terminal 10aa is requested to save a display screen, the screen capture unit 18 captures a screen shot, and temporarily stores the screen shot.

(iii) The query unit 25 of the transmission terminal 10aa requests the transmission management system 50 to make a query through the transmission and reception unit 11. The query is for the transmission terminals 10, in which image data (e.g., imaging data and/or display data) is displayed on the display 130. Here, the transmission terminals 10ab, 10ba, and 10bb are identified, which are corresponding to the display regions A22 to A24. The transmission management system 50 identifies the transmission terminals 10ab, 10ba, and 10bb, which are establishing the corresponding sessions with the transmission terminal 10aa. Then, the transmission management system 50 makes the query as to whether capturing of the screen shot is allowed.

(iv) The transmission and reception unit 11 of each of the transmission terminals 10ab, 10ba, and 10bb receives the query, and the display control unit 17 displays a confirmation dialog D1 on the display 130. In the confirmation dialog D1, an allow button 501 and a disallow button 502 are displayed with respect to a message such that, "AAA is attempting to save the conference image."

A user, who is another party of the conference, presses the allow button 501 or the disallow button 502 of the confirmation dialog D1. Here, the confirmation dialog D1 may be displayed on the information providing device 30.

(v) The operation input reception unit 12 of each of the transmission terminals 10ab, 10ba, and 10bb receives the press by a user of the allow button 501 or the disallow button 502, and the transmission and reception unit 11 transmits information of the selected button to the transmission management system 50. The transmission management system 50 transmits the information of the selected button to the transmission terminal 10aa, which has made the query.

(vi) After transmitting the query, the display control unit 17 of the transmission terminal 10aa displays an image capture wait dialog D2. The image capture wait dialog D2 is a dialog for reporting to a user of the transmission terminal 10aa that the query to another party of the conference is in progress; and for reporting which transmission terminals 10 transmit the information of the selected button and which transmission terminals 10 do not transmit the information of the selected button to the user of the transmission terminal 10aa. In the figure, it is shown that the transmission terminal 10ab selects the allow button 501, and the transmission terminal 10ba selects the disallow button 502. Additionally, it is shown that the query is in progress for the transmission terminal 10bb. Further, for a case whereas a user does not select either the allow button 501 or the disallow button 502, a remaining wait time is displayed.

When the query unit 25 receives the button information indicating whether the allow button 501 is selected or the disallow button 502 is selected from all the terminals 10ab, 10ba, and 10bb, the query unit 25 commands the image editor unit 24 to edit the image. Here, when the button information indicating whether the allow button 501 or the disallow button 502 is selected is not received from at least one of the transmission terminals 10 within a predetermined time period from making the query, the query unit 25 determines that a session is timed out, and determines that the at least one of the transmission terminals 10 selects the disallow button 502.

[Image Editing]

Next, image editing is explained by referring to FIGS. 10A and 10B. The image editor unit 24 captures a screen shot of a display screen, which is displayed on the display 130, immediately after the screen shot button B33 is pressed. Then, the image editor unit 24 temporarily stores the screen shot as it is in the RAM 103 or the like. By doing this, the display screen at the moment at which a user presses the screen shot button B33 can be saved, even if a predetermined time period has elapsed for receiving the button information indicating whether the allow button 501 or the disallow button 502 is selected from each of the transmission terminals 10, or for determining the button information by the transmission terminal 10 itself.

FIG. 10A shows an example of a temporarily saved image. In the screen shot, which is temporarily saved, image data (e.g. imaging data and/or display data) of all the transmission terminals 10*ab*, 10*ba*, and 10*bb* is displayed. Here, this screen shot may not be displayed on the display 130 of the transmission terminal 10*aa*. However, this screen shot may be encrypted.

After that, when the button information indicating whether the allow button 501 or the disallow button 502 is selected is received from each of the transmission terminals 10, or when the session is timed out for a transmission terminal 10, the image editor unit 24 edits the corresponding region of the image data (e.g., imaging data and/or display data), which is transmitted from the transmission terminal 10 which selects the disallow button 502 or the transmission terminal 10 for which the session is timed out. For the example of FIG. 10B, the transmission terminal 10*ba* selects the disallow button 502, and the session of the transmission terminal 10*bb* is timed out. Accordingly, the image editor unit 24 edits the display region A23 in which imaging data of the transmission terminal 10*ab* is displayed, and edits the display region A24 in which imaging data of the transmission terminal 10*ba* is displayed.

Here, editing is image processing for disabling visibility of a region. For example, the following are examples of such an editing method.

Blacking out the region (replacing pixel values with pixel values of 0)

Replacing the region with a predefined landscape image

Lowering brightness of the region (luminosity values are uniformly lowered to the extent that a person may not be identified)

Increasing brightness of the region (luminosity values are uniformly increased to the extent that a person may not be identified)

Overwriting a pattern such as with a checkered pattern or half-tone dot meshing

By doing this, an image of a user of the transmission terminal, who disallows capturing the data, can be prevented from being saved. The image editor unit 24 stores the edited image in the image storage area 231, and deletes the temporarily stored image.

Here, when at least one of the transmission terminals 10 (an other party of the conference) disallows capturing the image, instead of individually editing the images, the temporarily stored capture of the screen shot can be discarded, so that no screen shots are saved.

Figure 11:
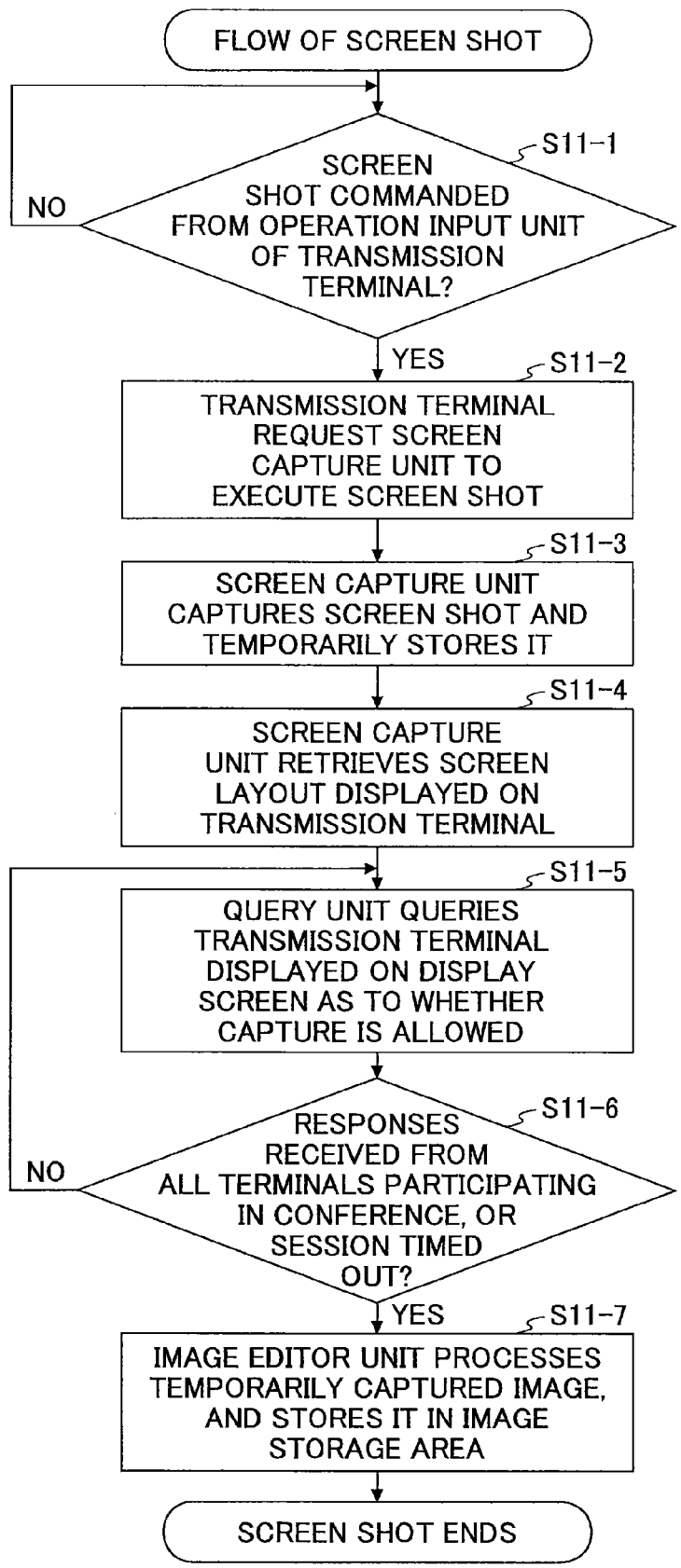
FIG. 11 is a diagram showing an example of a flowchart of a procedure for the information providing device and the transmission terminal of creating a screen shot of the display screen.

FIG. 11 is a flowchart showing an example of a procedure of capturing a screen shot of a display screen by the information providing device 30 and the transmission terminal 10. The processing flow of FIG. 11 is repeatedly executed, when the information providing device 30 communicates with the transmission terminal 10, and display data of the information providing device 30 is transmitted. The screen control unit 34 of the information providing device 30 displays the screen shot button B33 below the transmission interruption button B32.

The operation input reception unit 33 of the information providing device 30 determines whether a user presses the screen shot button B33 (S11-1). When the screen shot button B33 is not pressed (S11-1: No), the information providing device 30 periodically repeats the determination.

When the screen shot button B33 is pressed (S11-1: YES), the NFC transmission and reception unit 31 or the Bluetooth transmission and reception unit 32 transmits an event of the screen shot to the transmission terminal 10, and requests the transmission terminal 10 to execute the screen shot (S11-2).

The screen capture unit 18 of the transmission terminal 10 temporarily stores the screen shot in the RAM 103 (S11-3).

The screen capture unit 18 retrieves screen layout information at a moment of capturing the screen shot from the display control unit 17 (S11-4).

The query unit 25 queries the displayed transmission terminal 10 of an other party as to whether capturing of the screen shot image is allowed (S11-5).

The query unit 25 determines whether button information indicating whether the allow button 501 or the disallow button 502 is selected from all the transmission terminals 10 to which the query is transmitted, or whether the session is timed out (S11-6).

When the button information is received from all the transmission terminals 10, or when the session is timed out (S11-6: YES), the image editor unit 24 edits the temporarily saved screen shot, and stores the edited screen shot in the image storage area 231 (S11-7). Namely, a region is blacked out, in which image data of the transmission terminal 10 that disallows capturing is displayed, or in which image data of the transmission terminal 10 that does not respond within the predetermined time is displayed. By doing this, a portrait of the participant, who uses the transmission terminal 10 that disallows capture of the screen shot image, can be prevented from being saved.

For a user who selects "disallow," it is likely that the user disallows capturing of the screen shot for the next query. Accordingly, for such a user, the transmission terminal 10 may store the button information corresponding to "disallow." For a user who once selects "allow," it is uncertain whether the user allows capturing of the screen shot for the next query. Accordingly, for such a user, a query may be made again.

In the confirmation dialog D1, buttons may be provided such as "always allow," "always disallow," "allow only once," and "disallow only once." By selecting "always allow," a user who allows capturing of the screen shot may not be required to answer the confirmation dialog D1 again.

In the above explanation, the query may be made when the screen shot includes the imaging data of the transmission terminal 10. However, the query may be made when a screen shot includes display data. Since, in many cases, display data includes presentation materials of a conference, if such display data can be freely captured, security may be lowered. In such a case, the query unit 25 may retrieve a terminal ID of the transmission terminal 10 that displays display data from the display control unit 17, and the query unit 25 may query the identified transmission terminal 10 as to whether capturing of the display data is allowed.

As explained above, the transmission system according to the embodiment can capture a screen shot of a display screen, which is displayed on the transmission terminal 10. For capturing such a screen shot, permission is obtained from users. Thus, a portrait or conference materials can be prevented from capturing without first obtaining permission from the users.

The scope of the present invention is not limited to the above-described embodiment. For example, the storage units 23 and 38 may be disposed at locations where the transmission terminal 10 and the information providing device 30 can be accessed through the communication network 2 or the like. Some functions of the transmission terminal 10 may be included in the information providing device 30. For example, the information providing device 30 may include the image editor unit 24 and the query unit 25. One transmission terminal 10 may communicate with a plurality of information providing devices 30.

As explained above, a user may switch amongst the layouts of FIGS. 5A to 5C by pressing the predetermined button. In this case, it is possible for the transmission terminal 10 to switch to a desired layout. However, it may not be possible to find which layout a user of another transmission terminal 10 is interested in.

Accordingly, hereinafter, another example of the transmission system 1 is explained such that a user of the transmission terminal 10 can subsequently find a layout in which an other user of an other transmission terminal 10 is interested, by using the function of the screen shot.

Figure 12:
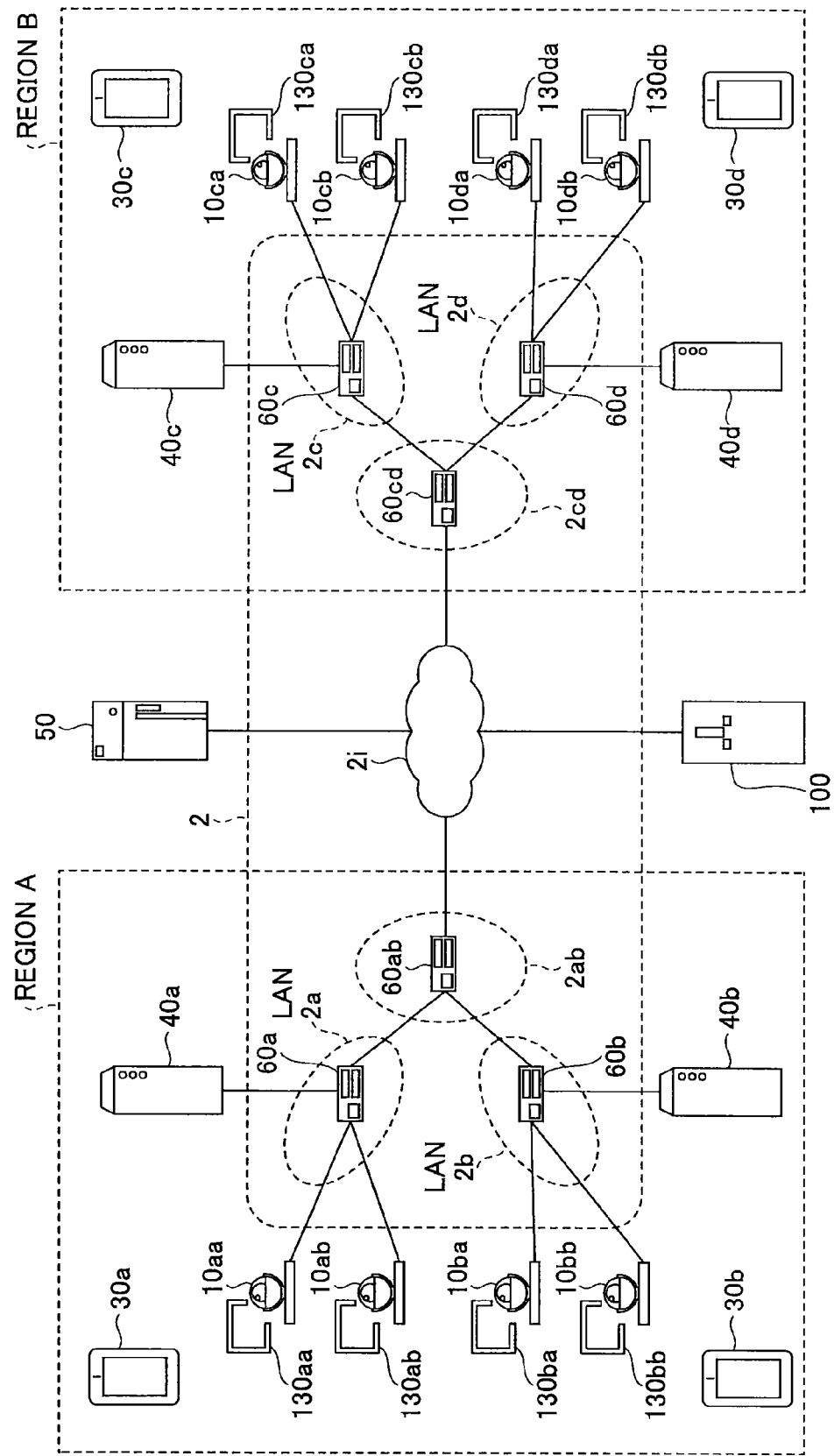
FIG. 12 is a diagram showing an example of the configuration of the transmission system.

FIG. 12 is a diagram showing an other example of the transmission system 1. In this example, since an element having the same reference symbol as that of FIG. 1 functions in the same manner, only the main components of the transmission system 1 according to this example may be explained. In this example, instead of the program providing system 70, a data server 100 is connected to the transmission terminal 10 through the Internet 2*i*, so that the data server 100 and the transmission terminal 10 can communicate with each other. Here, the program providing system 70 is included in the transmission system 1, but it is not shown in the figure.

The data server 100 stores a screen shot. When the transmission terminal 10 or the information providing device 30 requests viewing of the screen shot from the data server 100, the transmission terminal 10 or the information providing device 30 can view the screen shot. The data server 100 may be an information processing apparatus. Alternatively, the data sever 100 may be a storage device, such as a Network Attached Storage (NAS).

Figure 13:
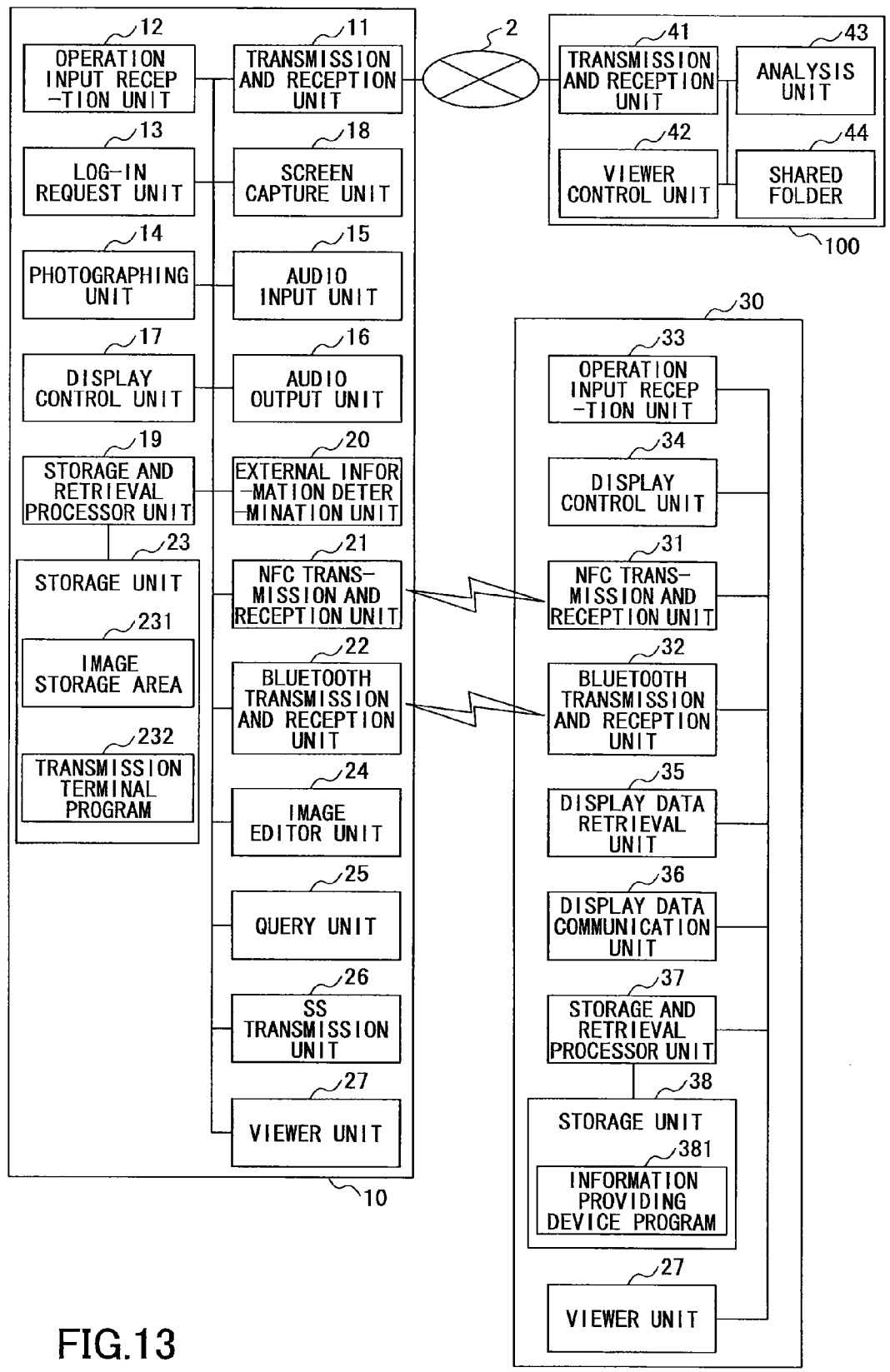
FIG. 13 is a block diagram showing examples of functional configurations of the transmission terminal and the information providing device.

FIG. 13 is a block diagram showing functional configurations of the transmission terminal 10 and the information providing device 30. In this example, the transmission terminal 10 includes an SS transmitting unit 26 and a viewer unit 27. The SS transmitting unit 26 transmits a screen shot saved by the screen capture unit 18 to the data server 100. Here, the SS transmission unit 26 adds a suitable name to the screen shot. The viewer unit 27 accesses the data server 100, and causes the display 130 to display a screen shot.

Here, viewing can be made from an information processing device that can communicate with the data server 100, instead of the transmission terminal 10. FIG. 13 shows that the information providing device 30 also includes a viewer unit 27. However, an information processing device that can view the screen shot is not limited to the information providing device 30.

The data server 100 includes a transmission and reception unit 41, a viewer control unit 42, an analysis unit 43, and a shared folder 44. The transmission and reception unit 41 receives a screen shot. When a viewing request is received, the transmission and reception unit 41 transmits a screen shot. When a viewing request is received, the viewer control unit 42 reads out a screen shot from the shared folder 44. The analysis unit 43 counts screen shots for each layout. The shared folder 44 is a folder for capturing a screen shot, which is transmitted from each of the transmission terminals 10.

FIG. 14A is a diagram illustrating an example of a system configuration for transmitting a screen shot to the data server 100, in the transmission system 1. As explained above, the screen capture unit 18 of the transmission terminal 10*aa* creates a screen shot, and the image editor unit 24 edits the screen shot image, if necessary, and the image editor unit 24 stores the screen shot in the image storage area 231. A user may select a screen shot to be transmitted to the data server 100 by operating the transmission terminal 10*aa*. In FIG. 14A, a file (AAA_XXX.jpg) of a screen shot is transmitted by a POST command of the HTTP.

The SS transmission unit 26 adds a file name to a screen shot to be transmitted, or adds file names to all the screen shots stored in the image storage area 231. A file name of a screen shot is generated to include character strings of "terminal ID" and "date." As the terminal ID, the ID stored in the transmission terminal 10 itself may be retrieved. The date may be retrieved from a built-in clock included in the transmission terminal 10. For example, a file name of a screen shot, which is saved by the transmission terminal 10 with a terminal ID of "AAA" at "7/7/2012, 14:50, 23 seconds," may be "AAA_201207071450023.extension." Since a file name includes a terminal ID and date and time information, the data server 100 can execute control, such as allowing viewing of a screen shot to only the transmission terminal 10 which saves the screen shot, or allowing viewing of a screen shot in a predetermined time interval. Here, instead of including the terminal ID and the date and time information in the file name, the terminal ID and the date and time information may be held in a tag or metadata of a file.

When the transmission and reception unit 41 of the data server 100 receives a screen shot, the transmission and reception unit 41 stores the screen shot in the shared folder 44. Here, the file name may be attached to the screen shot when the data server 100 receives the screen shot. As shown in FIG. 14A, screen shots, which are transmitted from corresponding transmission terminals 10, are stored in the shared folder 44.

Figure 14B:
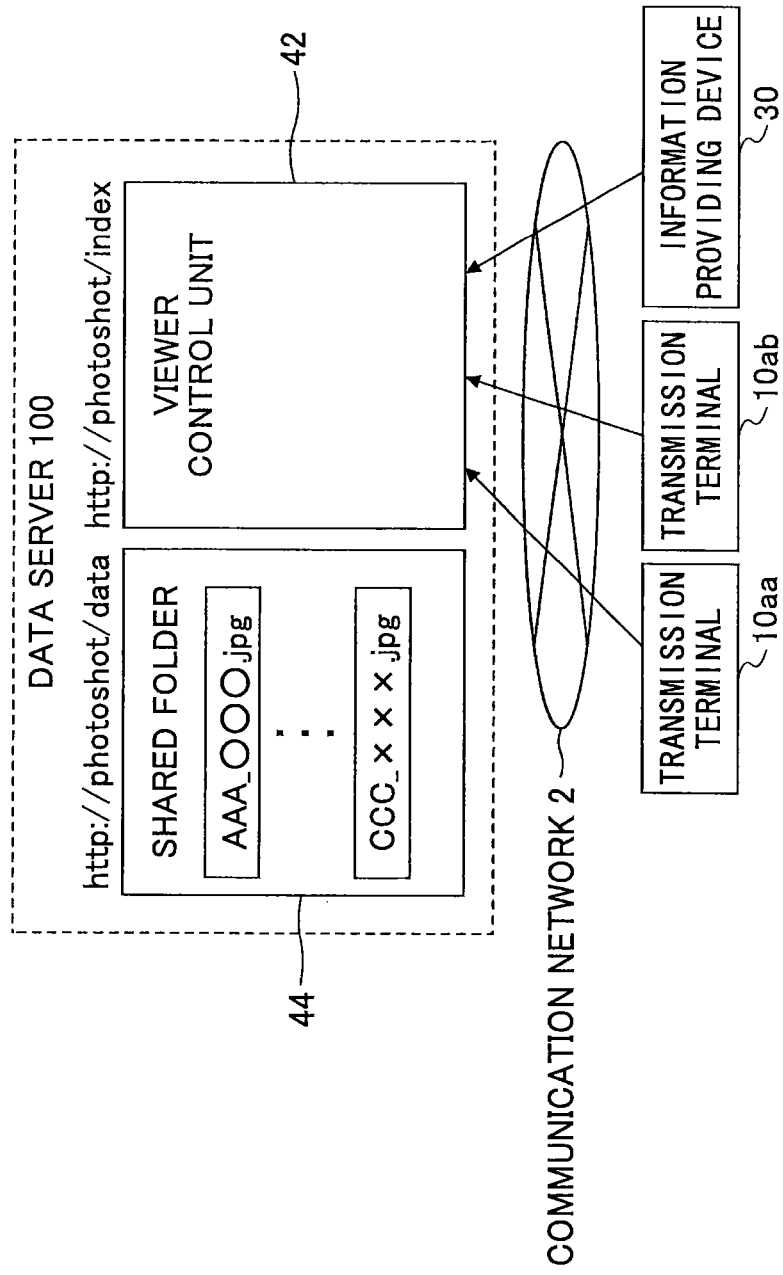

FIG. 14B is a diagram illustrating an example of a system configuration for viewing a screen shot by the transmission terminal 10 or the like, in the transmission system 1. The viewer unit 27 is a viewing function, for example. The viewer unit 27 accesses a URL, "http://photoshot/index," which is specified by a user. An access method of the transmission terminal 10 may be different from that of the information providing device 30. Since the usage of the transmission terminal 10 is limited, operability may be enhanced, if access can be made by a file sharing service, such as server message block (SMB). A generic information processing device, such as the information providing device 30, may access by the viewer, or an application that communicates with the data server 100 in accordance with a predetermined communication protocol.

Figure 15A:
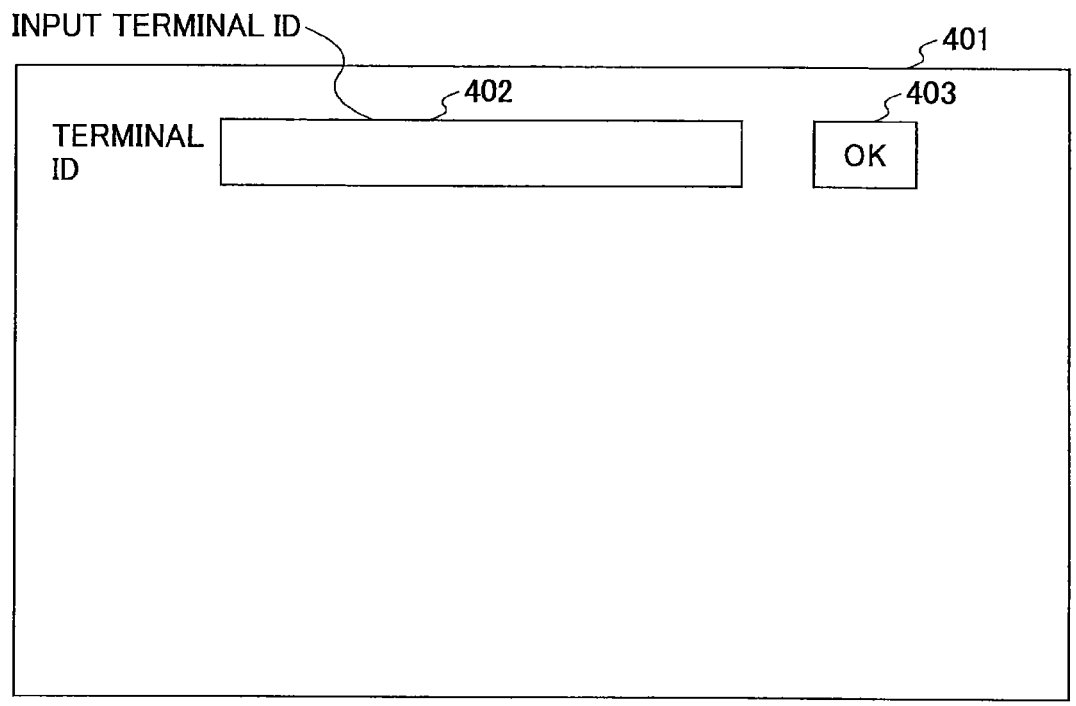
FIGS. 15A and 15B are diagrams showing examples of screens displayed on the display of the transmission terminal or a display of the information providing device.
Figure 15B:
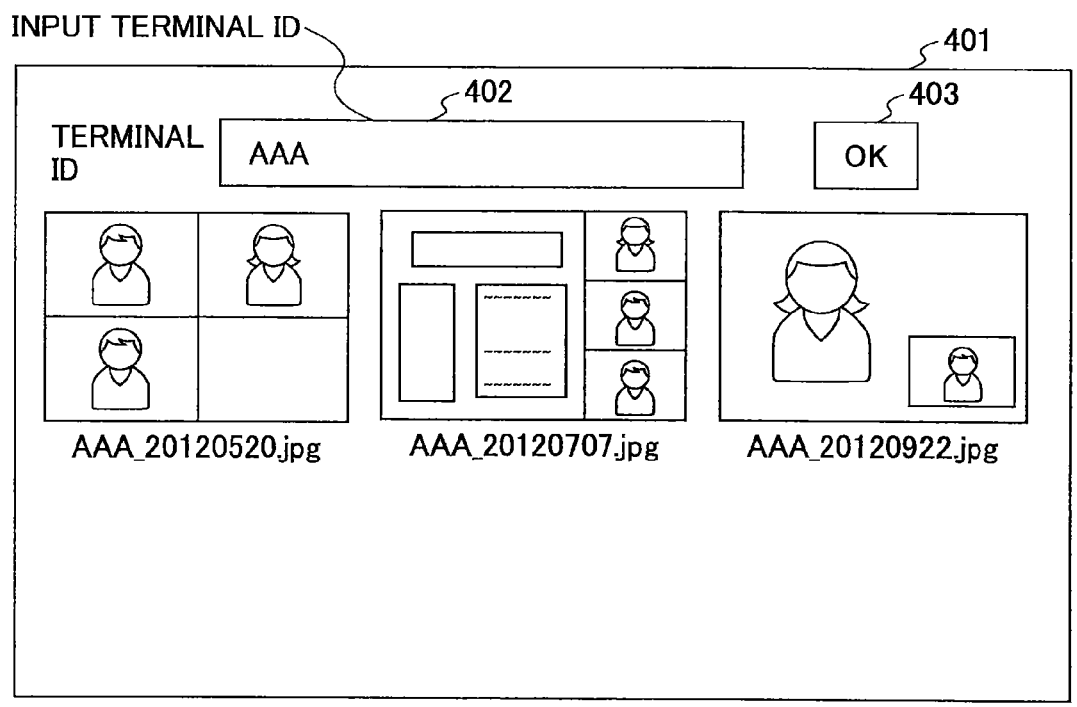

FIG. 15A is a diagram showing an example of a screen displayed on the display 130 of the transmission terminal 10 or the display 306 of the information providing device 30. Here, suppose that the transmission terminal 10*ab* requests viewing from the data server 100. The viewer control unit 42 transmits a terminal ID input screen 401 to the transmission terminal 10*ab*, which accesses the data server 100, or the information providing device 30. In the terminal ID input screen 401, a terminal ID input box 402 is arranged. A user may enter a desired terminal ID (a screen shot transmitted by the user or another screen shot can be viewed).

After entering the terminal ID, when the user presses an OK button 403, the viewer unit 27 transmits the terminal ID to the data server 100. The viewer control unit 42 of the data server 100 searches for the screen shot transmitted by the transmission terminal 10ab corresponding to the received terminal ID from the shared folder 44, and the viewer control unit 42 transmits the screen shot to the transmission terminal 10ab. The screen shot, which is transmitted at this moment, may be a thumbnail.

FIG. 15B is a diagram showing an example of the terminal ID input screen 401 in which screen shots are displayed. Since the user inputs "AAA" as a terminal ID, in the terminal ID input screen 401, screen shots are displayed, which have corresponding file names including "AAA." To enhance perspicuity of the screen shots, the screen shots are displayed as thumbnail images, or the screen shots are displayed in reduced sizes.

When the thumbnail images or the reduced images of the screen shots are transmitted from the data server 100, and when a user selects (clicks) one screen shot, the whole of the selected screen shot is transmitted from the data server 100 to the transmission terminal 10ab or the information providing device 30.

The viewer unit 27 can specify a screen shot to be browsed in detail by a file name of the screen shot.

When a terminal ID is divided by a specific symbol (e.g. spaces), and a plurality of terminal IDs is input, screen shots transmitted from the plurality of the transmission terminals 10 are displayed.

When a date (e.g., Jan. 1, 2012) is input, screen shots created by the specified date are displayed. When a time interval is specified, screen shots created in the time interval are displayed.

When a combination of a terminal ID and a date is input, corresponding screen shots are displayed.

When the OK button 403 is pressed without inputting any terminal ID, the data server 100 displays all the screen shots stored in the shared folder 44.

[Evaluation of a Layout]

A user who confirms a list of screen shots, such as shown in FIG. 15B, may find which layout an other user of the other transmission terminal 10 is interested in. For example, when a user of the transmission terminal 10ab inputs "AAA" as a terminal ID, the user can find a layout of a display screen, which is saved as a screen shot by another user of the transmission terminal 10aa. In FIG. 15B, the PandP mode, the PC screen multi-view mode, the PinP mode are displayed from the left side in this order. For example, when the PinP mode is in the majority as a layout of a screen shot, it can be found that the user of the transmission terminal 10aa prefers the layout of the PinP mode. In this manner, a user of the transmission terminal 10ab can find layouts preferred by users of the corresponding transmission terminals 10, only by inputting the terminal IDs of the corresponding transmission terminals 10 in order, which have participated in a conference.

Figure 16A:
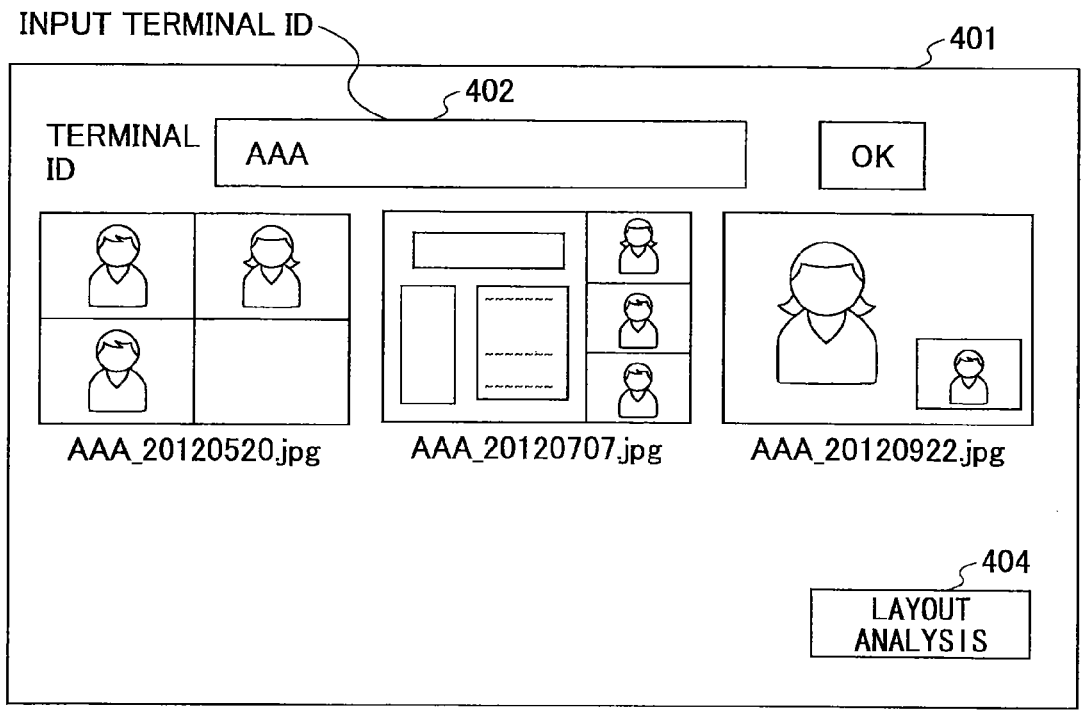
FIGS. 16A and 16B are diagrams showing examples of an image list screen.

Further, it is effective to automatically analyze the layout. FIG. 16A is a diagram showing an example of an image list screen. In FIG. 16A, a layout analysis button 404 is displayed. When a user presses the layout analysis button 404, the data server 100 is informed that the layout analysis button 404 is pressed. The analysis unit 43 of the data server 100 analyzes layouts of screen shots of the transmission terminal 10, which corresponds to the terminal ID input in the transmission terminal ID input box 402. Specifically, a number of screen shots are counted for each of the layouts, and the counting result is transmitted to the transmission terminal 10 of the information providing device 30.

Figure 16B:
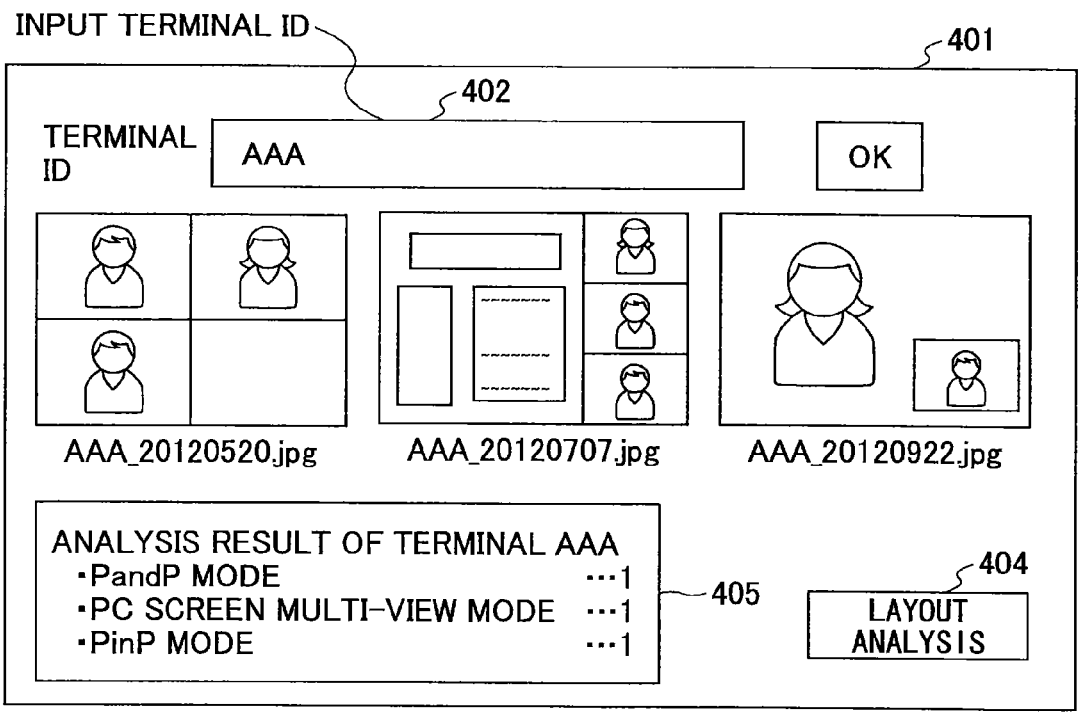

FIG. 16B is a diagram showing an example of the image list screen in which the analysis result is displayed. In the analysis result, as an "analysis result of the terminal AAA," the following are displayed.

PandP mode . . . 1

PC screen multi-view mode . . . 1

PinP mode . . . 1

In this manner, a user of the transmission terminal 10ab, for example, can numerically found a layout, in which another user of the transmission terminal 10aa is interested.

Figure 17:
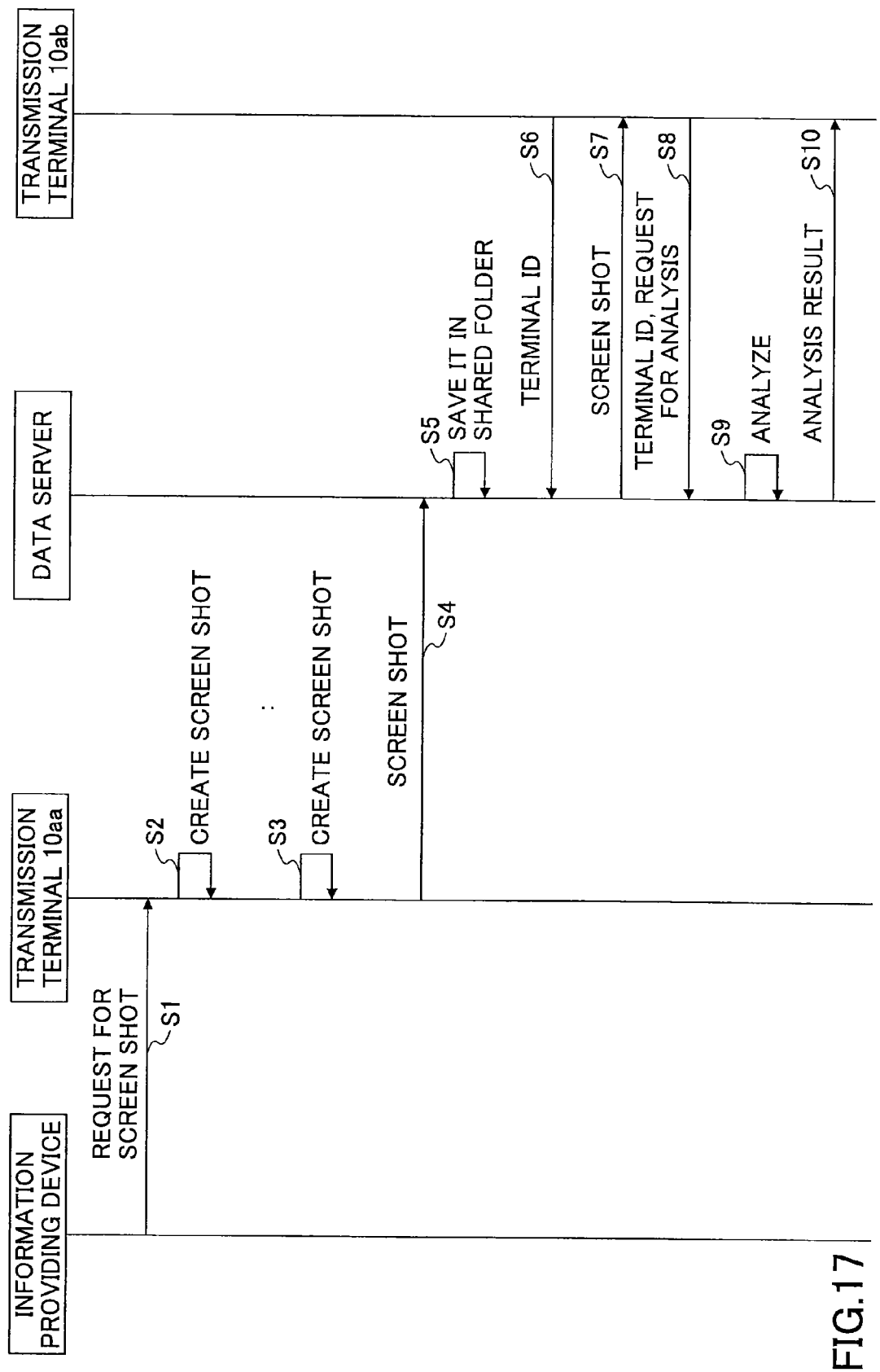
FIG. 17 is a sequence diagram of an example of a procedure of a transmission terminal for analyzing a layout, in which an other transmission terminal is interested.

FIG. 17 is a sequence diagram showing an example of a procedure for the transmission terminal 10ab to analyze a layout, in which the transmission terminal 10aa is interested.

S1: When a user presses the screen shot button B33, the information providing device 30 requests creation of a screen shot from the transmission terminal 10aa.

S2: The screen capture unit 18 of the transmission terminal 10aa creates a screen shot of a display screen. Namely, the screen shot is temporarily stored, and subsequently queries are made as to whether capturing is allowed. If it is necessary, the screen shot is edited, and the screen shot is stored in the image storage area 231.

S3: Each time the user of the transmission terminal 10aa presses the button B33, a screen shot is created.

S4: When the user operates the transmission terminal 10aa, so that the screen shot is transmitted to the data server 100 (or automatically), the SS transmission unit 26 of the transmission terminal 10aa transmits the screen shot to the data server 100.

S5: The data server 100 stores the screen shot in the shared folder 44.

S6: Subsequently, for example, the transmission terminal 10ab transmits a terminal ID (AAA) to the data server 100.

S7: The viewer control unit 42 of the data server 100 reads out screen shots having file names, which include the terminal ID, from the shared folder 44, and transmits the screen shots to the transmission terminal 10ab.

S8: Further, for example, a terminal ID and a request for analysis are transmitted from the transmission terminal 10ab.

S9: The analysis unit 43 analyzes layouts of the corresponding screen shots having the file names, which include the terminal ID.

S10: The transmission and reception unit 41 of the data server 100 transmits the analysis result to the transmission terminal 10ab.

As explained above, in the transmission system 1, by registering screen shots to the data server 100, a user of the transmission terminal 10 can subsequently find a layout, in which an other user of an other transmission terminal 10 is interested.

Hereinabove, the transmission terminal that communicates predetermined data including image data with an other transmission terminal connected to a communication network, the transmission system including the transmission terminal, and the non-transitory computer readable storage medium storing a program for achieving the functions of the transmission terminal are explained by the embodiment. However, the present invention is not limited to the embodiment, and variations and modifications may be made within the scope of the present invention. Specific examples of numerical values are used in order to facilitate understanding of the invention. However, these numerical values are simply illustrative, and any other appropriate values may be used, except as indicated otherwise. For convenience of explanation, the devices according to the embodiment of the present invention are explained by using functional block diagrams. However, these devices may be implemented in hardware, software, or combinations thereof. The software may be prepared in any appropriate non-transitory computer-readable storage medium, such as a random access memory (RAM), a flash memory, a read-only memory (ROM), an EPROM, an EEPROM, a register, a hard disk drive (HDD), a removable disk, a CD-ROM, a database, a server, and the like.

The present application is based on and claims the benefit of priority of Japanese Priority Application No. 2013-048495 filed on Mar. 11, 2013, the entire contents of which are hereby incorporated herein by reference.

What is claimed is:

1. A transmission terminal comprising:
   a communication unit configured to communicate with an information providing device that displays a predetermined image;
   a display control unit configured to display at least one of first image data created by a photographing unit, second image transmitted from another transmission terminal, and display data received from the information providing device on a display screen;
   a network communication unit configured to communicate the first image data, the second image data, and the display data with the other transmission terminal, the other transmission terminal being connected to a communication network;
   a screen information capture unit configured to save screen information displayed on the display screen;
   a query unit configured to query the other transmission terminal whether capturing of the screen information is allowed, and configured to determine that the other transmission terminal disallows capturing of the screen image when no response is received from the other transmission terminal within a predetermined time period after making the query;
   a screen editor unit configured to edit the screen information in regards to a response from the other transmission terminal; and
   a screen information storage unit configured to store the screen information, wherein the screen information is edited by the screen editor unit in regards to the response.

2. The transmission terminal according to claim 1, wherein the screen information capture unit is configured to capture the screen information displayed on the display screen in regards to a request from the information providing device.

3. The transmission terminal according to claim 1, wherein the display control unit is configured to store a region of the screen information and identification information of the other transmission terminal, wherein the region and the identification information are associated with each other, and the first image data, the second image data, or the display data is to be arranged in the region; and
   wherein, when the second image data received from the other transmission terminal that disallows capture of the screen information is arranged in the region, the screen editor unit is configured to edit the region to be visually unrecognizable.

4. The transmission terminal according to claim 3, wherein the screen information capture unit is configured to save the screen information and configured to temporarily store the captured screen information, immediately after receiving a request for capturing the screen information from the information providing device; and
   wherein the screen information capture unit is configured to store the screen information in the screen information storage unit, after the screen editor unit edits the screen information in regards to the response from the other transmission terminal.

5. The transmission terminal according to claim 1, further comprising:
   a screen information transmission unit configured to transmit the screen information stored in the screen information storage unit to a storage device, together with identification information of the transmission terminal, wherein the storage device is connected to the communication network; and
   a viewer unit configured to request, when the viewer unit receives an input of the identification information, viewing of the screen information transmitted from the transmission terminal having the identification information to the storage device, and configured to display the screen information received from the storage device on the display screen.

6. The transmission terminal according to claim 5, wherein the screen information transmission unit is configured to transmit the screen information to the storage device, together with date and time information indicating date and time of storing the screen information in the transmission terminal, and
   wherein the viewer unit is configured to request, when the viewer unit receives an input of the date and time information, viewing of the screen information stored on the date and time, and configured to display the screen information received from the storage device on the display screen.

7. The transmission terminal according to claim 5, wherein the display control unit is configured to change, when the display control unit receives a predetermined operation, a layout of the first image data, the second image data, or the display data in the screen information, and
   wherein the viewer unit is configured to display statistical information of the layout of the screen information transmitted from the transmission terminal having the identification information to the storage device, wherein the layout of the screen information is analyzed by the storage device.

8. A transmission system including a transmission terminal, an other transmission terminal, and an information providing device;
   wherein the transmission terminal comprises:
   a communication unit configured to communicate with the information providing device that displays a predetermined image;
   a display control unit configured to display at least one of first image data created by a photographing unit, second image data transmitted from the other transmission terminal, and display data received from the information providing device on a display screen;
   a network communication unit configured to communicate the first image data, the second image data, and the display data with the other transmission terminal, wherein the other transmission terminal is connected to a communication network;
   a screen information capture unit configured to save screen information displayed on the display screen;
   a query unit configured to query the other transmission terminal whether capturing of the screen information is allowed, and configured to determine that the other transmission terminal disallows capture of the screen image when no responses are received from the other transmission terminal within a predetermined time period after making the query;

a screen editor unit configured to edit the screen information in regards to a response from the other transmission terminal;

a screen information storage unit configured to store the screen information, wherein the screen information is edited by the screen editor unit in regards to the response; and a display data transmission unit configured to transmit the display data to the other transmission terminal.

9. The transmission system according to claim 8, wherein the transmission terminal includes a non-transitory computer-readable storage medium storing a program that causes the display data transmission unit to transmit the display data to the other transmission terminal.

10. A non-transitory computer-readable storage medium storing a program that causes a computer to execute a process, the process comprising:

communicating with an information providing device that displays a predetermined image;

displaying at least one of first image data created by a photographing unit, second image data transmitted from another transmission terminal, and display data received from the information providing device on a display screen;

communicating the first image data, the second image data, and the display data with the other transmission terminal, wherein the other transmission terminal is connected to a communication network;

capturing screen information displayed on the display screen;

querying the other transmission terminal whether capturing of the screen information is allowed, determining that the other transmission terminal disallows capture of the screen image when no responses are received from the other transmission terminal within a predetermined time period after making the query;

editing the screen information in regards to a response from the other transmission terminal; and storing the screen information, wherein the screen information is edited by the editing in regards to the response.

* * * * *